(12) United States Patent
Huang

(10) Patent No.: US 9,568,791 B2
(45) Date of Patent: Feb. 14, 2017

(54) LIQUID CRYSTAL DISPLAY DEVICE

(71) Applicant: Shanghai Tianma Micro-Electronics Co., Ltd., Shanghai (CN)

(72) Inventor: Xianjun Huang, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 386 days.

(21) Appl. No.: 13/962,939

(22) Filed: Aug. 8, 2013

(65) Prior Publication Data

US 2013/0321730 A1    Dec. 5, 2013

Related U.S. Application Data

(63) Continuation of application No. PCT/CN2012/080784, filed on Aug. 30, 2012.

(30) Foreign Application Priority Data

Aug. 30, 2011  (CN) .......................... 2011 1 0254100

(51) Int. Cl.
*G02F 1/1333* (2006.01)
*G02F 1/1362* (2006.01)
*G09G 3/00* (2006.01)
*G09G 3/36* (2006.01)
*G02F 1/13* (2006.01)

(52) U.S. Cl.
CPC ..... *G02F 1/13624* (2013.01); *G02F 1/136259* (2013.01); *G09G 3/006* (2013.01); *G02F 1/1309* (2013.01); *G02F 1/136286* (2013.01); *G02F 2001/136254* (2013.01); *G09G 3/3611* (2013.01)

(58) Field of Classification Search
CPC .. G02F 1/1362; G02F 1/13624; G02F 1/1309; G02F 1/136286; G02F 1/136259; G02F 2001/136254; G09G 3/006; G09G 3/3611
USPC ....................... 349/40, 54–55, 192
See application file for complete search history.

(56) References Cited

U.S. PATENT DOCUMENTS

| 7,046,030 B2* | 5/2006 | Kim ...................... G02F 1/1303 324/760.02 |
| 2004/0017531 A1* | 1/2004 | Nagata .................. G02F 1/1309 349/139 |
| 2009/0290096 A1 | 11/2009 | Yoon et al. |

(Continued)

FOREIGN PATENT DOCUMENTS

| CN | 102012593 A | 4/2011 |
| CN | 102087437 A | 6/2011 |

(Continued)

*Primary Examiner* — Charles Chang
(74) *Attorney, Agent, or Firm* — Alston & Bird LLP

(57) ABSTRACT

Disclosed are a liquid crystal display device and a testing method thereof. The liquid crystal display device includes a plurality of scan lines, and a plurality of data line sets crossing the scan lines, where each data line set includes a first data line, a second data line, and a third data line. The device also includes a shorting bar for the data lines, a first data switch control line and a second data switch control line. Through holes are not used to connect the data lines and the shorting bar, thus disadvantages of display devices caused by defects in through holes is eliminated. Additionally, the area for testing structures is decreased, so that a small-sized liquid crystal display devices can be produced.

8 Claims, 13 Drawing Sheets

(56) References Cited

U.S. PATENT DOCUMENTS

2012/0169346 A1* 7/2012 Huang .................. G02F 1/1309
  324/414

FOREIGN PATENT DOCUMENTS

| CN | 102109688 A | 6/2011 |
|----|-------------|--------|
| CN | 102116950 A | 7/2011 |
| JP | 9-311667 A | 12/1997 |

* cited by examiner

LIQUID CRYSTAL DISPLAY DEVICE

CROSS-REFERENCES TO RELATED APPLICATIONS

This application claims priority to and is a continuation of International Application No. PCT/CN2012/080784, filed on Aug. 30, 2012 and entitled "LIQUID CRYSTAL DISPLAY DEVICE", which application claims the benefit of Chinese Patent Application No. 201110254100.3, filed with the Chinese Patent Office on Aug. 30, 2011 and entitled "LIQUID CRYSTAL DISPLAY DEVICE AND TESTING METHOD THEREOF", the contents of which are incorporated herein by reference in their entirety.

FIELD OF THE INVENTION

The technology relates to display devices, and in particular to a liquid crystal display device.

BACKGROUND OF THE INVENTION

A liquid crystal display device is provided with an effective display area formed by display pixels in a matrix shape. The effective display area is provided with a plurality of scan lines extending along the row direction of the display pixels and a plurality of data lines extending along the column direction of the display pixels. Switch elements and pixel electrodes connected with the switch elements are arranged at intersections of the scan lines and the data lines. The switch elements are, for example, thin film transistors (TFTs), and the switch elements can respond to signals supplied to each scan line and send the signals from the data lines to each corresponding pixel electrode. The scan lines and the data lines extend to the peripheral part of the effective display area (for example, the scan lines and data lines are connected with a drive circuit), and the quality of pictures displayed in the effective display area is tested by inputting test signals at the peripheral part. The scan lines, the data lines and other circuit connecting lines are usually collectively referred to as signal lines.

With the increase of display pixel density, various signal lines such as the scan lines and the data lines in the effective display area and the peripheral part thereof are thinner and thinner in line width, and intervals are smaller and smaller, so various poor wiring conditions such as line breakage and short circuits are more likely. Therefore, for timely discovery of the poor wiring conditions, preventing large-scale poor conditions and preventing rejects from entering the next procedure to cause the waste of materials, the scan lines, the data lines and other signal lines are required to be checked after wiring so as to determine whether the poor wiring conditions exist or not.

At present, a common detecting method for the liquid crystal display device is that respective signal lines are connected together by using a plurality of shorting bars, test signals are input to the shorting bars, the test signals are transmitted to the scan lines and the data lines of the effective display area through corresponding elements, and the quality of the pictures displayed in the effective display area is detected.

An example is shown in FIG. 1, which is a structural schematic diagram of a liquid crystal display device. The liquid crystal display device comprises four shorting bars 101, 102, 103 and 104, test terminals 101a, 102a, 103a and 104a connected with the four shorting bars 101, 102, 103 and 104 respectively, six data lines D11, D12, D13, D14, D15 and D16, twelve connecting lines C1, C2, C3, C4, C5, C6, C7-1, C7-2, C8-1, C8-2, C9-1 and C9-2, three scan lines G11, G12 and G13, thin film transistors 105 and 106, through holes 107 and 108, and a switch control line 109.

In this case, the data lines D11 and D14 are red signal data lines, the data lines D12 and D15 are green signal data lines, and the data lines D13 and D16 are blue signal data lines. The data lines D11, D12, D13, D14, D15 and D16 are electrically connected with the connecting lines C1, C2, C3, C4, C5 and C6 through the thin film transistor 105 respectively. The connecting lines C1, C4 and the shorting bar 101, the connecting lines C2, C5 and the shorting bar 102, and the connecting lines C3, C6 and the shorting bar 103 are electrically connected through the through holes 107 and connecting metals (not shown in the figure) respectively. The scan lines G11, G12 and G13 are electrically connected with the connecting lines C7-1, C8-1 and C9-1 through the through holes 108 and connecting metals (not shown in the figure) respectively; the connecting lines C7-1, C8-1 and C9-1 and the connecting lines C7-2, C8-2 and C9-2 all intersect with the switch control line 109; and switch elements 106 are respectively formed at an intersection points of the connecting lines C7-1 and C7-2 and the switch control line 109, an intersection points of the connecting lines C8-1 and C8-2 and the switch control line 109 and an intersection points of the connecting lines C9-1 and C9-2 and the switch control line 109, so that the scan lines G11, G12 and G13 are electrically connected with the shorting bar 104 through the through holes 108, the connecting metals, the connecting lines C7-1, C8-1 and C9-1, the connecting lines C7-2, C8-2 and C9-2 and the switch elements 106.

The shorting bars 101, 102 and 103 electrically connected with the data lines are called data line shorting bars. The shorting bar 104 connected with the scan lines is called a scan line shorting bar.

Generally speaking, the shorting bars 101, 102 and 103 and the connecting lines C1, C2, C3, C4, C5 and C6 are in different circuit layers (not formed in a same step), so the shorting bars 101, 102 and 103 are electrically connected with the corresponding connecting lines through the through holes 107. In detail, each through hole 107 comprises through holes 107-1 and 107-2, for example, the through hole 107-1 of the shorting bar 101 is electrically connected with the through hole 107-2 of the connecting line C4 through connecting metals (not shown in the figure), so that the shorting bar 101 is connected with the data line D14, and connecting modes of the other shorting bars and connecting lines are similar thereto. The connecting metals are generally indium tin oxide (ITO) or indium zinc oxide (IZO). Electric test can be carried out through inputting test signals to the test terminals 101a, 102a, 103a and 104a.

The shorting bars 101, 102 and 103 and the connecting lines C1, C2, C3, C4, C5 and C6 are positioned in different circuit layers, because overline connections are required between the shorting bar 101 and the connecting lines C1, C4 and between the shorting bar 102 and the connecting lines C2, C5. As shown in FIG. 1, the connecting line C1 is required to span the shorting bars 102 and 103 to be connected with the shorting bar 101. If the connecting lines and the shorting bars are formed in the same circuit layer, the connecting line C1 and the shorting bars 102 and 103 will be shorted.

Therefore, the liquid crystal display device has the following defects:

firstly, in the manufacturing process of the liquid crystal display device, for example, in the procedures of picking and placing glass in array process, coating an alignment film and rubbing the alignment film in box process and the like, the ITO or the IZO at the through holes 107 is often burnt due to high static electricity; due to the through hole defect, the antistatic function of the shorting bars is disabled and also an array substrate experiences a phenomenon of poor display when testing electrical property, so that the product is scrapped; and because each data line corresponds to a connecting line, the data lines D11, D12, D13, D14, D15 and D16 and the connecting lines C1, C2, C3, C4, C5 and C6 occupy a relatively larger area, which is adverse to reduce the size occupied by the test signal control part; and furthermore, because more data lines are superposed with the switch control line 109, switch signals of the switch elements are delayed.

BRIEF SUMMARY OF THE INVENTION

One inventive aspect is a liquid crystal display device. The display device includes a plurality of scan lines, and a plurality of data line sets intersecting the scan lines, where each data line set includes a first data line, a second data line, a third data line. The display device also includes a plurality of pixel units formed near intersections of the scan lines and the data lines, where the first data line in each data line set controls pixel units have a first color, the second data line in each data line set controls pixel units have a second color, and the third data line in each data line set controls pixel units have a third color. The display device also includes a data line shorting bar, a first date switch control line, and a second date switch control line, where the first data line in each data line set is connected with the data line shorting bar, where the first data switch control line intersects the second data line in each data line set. The display device also includes a first switch element formed at each intersection of the second data lines and the first data switch control line, where a gate electrode of the first switch element is arranged on the first data switch control line, where a source electrode of the first switch element is connected with the data line shorting bar, and a drain electrode of the first switch element is connected with the second data line, and where the second data switch control line intersects the third data line in each data line set. The display device also includes a second switch element formed at each intersection of the third data lines and the second data switch control line, where a gate electrode of the second switch element is arranged on the data switch control line, a source electrode of the second switch element is connected with the data line shorting bar through the first switch element, and a drain electrode of the second switch element is connected with the third data line.

Another inventive aspect is a liquid crystal display device. The display device includes a plurality of scan lines, and a plurality of data line sets intersecting the scan lines, where each data line set includes a first data line. The display device also includes a second data line, a third data line, and a plurality of pixel units formed in areas near intersections of the scan lines and the data lines, where the first data line in each data line set controls pixel units have a first color, the second data line in each data line set controls pixel units have a second color, and the third data line in each data line set controls pixel units have a third color. The display device also includes a data line shorting bar, a first date switch control line, a second date switch control line, a third date switch control line, where the first data switch control line intersects the first data line in each data line set. The display device also includes a first switch element formed at each intersection of the first data line and the data switch control line, where a gate electrode of the first switch element is arranged on the first data switch control line, where a source electrode of the first switch element is connected with the data line shorting bar, and where a drain electrode of the first switch element is connected with the first data line, where the second data switch control line intersects the second data line in each data line set. The display device also includes a second switch element formed at each intersection of the second data line and the second data switch control line, where a gate electrode of the second switch element is arranged on the second data switch control line, where a source electrode of the second switch element is connected with the data line shorting bar through the first switch element, and where a drain electrode of the second switch element is connected with the second data line. The third data switch control line intersects the third data line in each data line set. The display device also includes and a third switch element formed at each intersection of the third data line and the data switch control line, where a gate electrode of the third switch element is arranged on the third data switch control line, where a source electrode of the third switch element is connected with the data line shorting bar through the first switch element and the second switch element, and where a drain electrode of the third switch element is connected with the third data line.

Another inventive aspect is a liquid crystal display device. The display device includes a plurality of scan lines, and a plurality of data line sets intersected the scan lines, where each data line set includes a first data line, a second data line, a third data line, a fourth data line, a fifth data line and a sixth data line. The display device also includes a plurality of pixel units formed near intersections of the scan lines and the data lines, where the first data line and the fourth data line in each data line set control pixel units have a first color, the second data line and the fifth data line control pixel units have a second color, and the third data line and the sixth data line control pixel units have a third color. The display device also includes a data line shorting bar, a first date switch control line, a second date switch control line, and a third data switch control line of the data line set, where the first data switch control line intersects the second data line and the fifth data line in each data line set. The display device also includes a first switch element formed at each intersection of the second data line and the first data switch control line, and a second switch element is formed at each intersection of the fifth data line and the first data switch control line. The second data switch control line intersects the first data line and the fourth data line in each data line set. The display device also includes a third switch element formed at each intersection of the first data line and the second data switch control line, a fourth switch element formed at each intersection of the fourth data line and the second data switch control line, where the third data switch control line intersects the third data line and the sixth data line in each data line set. The display device also includes a fifth switch element formed at each intersection of the third data line and the third data switch control line, and a sixth switch element formed at each intersection point of the sixth data line and the third data switch control line, where gate electrodes of the first switch element and the second switch element are arranged on the first data switch control line. Gate electrodes of the third switch element and the fourth switch element are arranged on the second data switch control line, and gate electrodes of the fifth switch element and the sixth switch element are arranged on the third data switch control line. Source electrodes of the first, second, third, fourth, fifth, and sixth switch elements are connected with the data line shorting bar, and a drain electrode of the first switch element is connected with the second data line, a drain electrode of the second switch element is connected with the fifth data line, a drain electrode of the third switch element is connected with the first data line, a drain electrode of the fourth switch element is connected with the fourth data line, a drain electrode of the five switch element is connected with the third data line, and a drain electrode of the sixth switch element is connected with the sixth data line.

DETAILED DESCRIPTION OF THE INVENTION

As mentioned in the background, because the data line shorting bar and the connecting lines are generally positioned in different circuit layers, the data line shorting bar is electrically connected with the connecting lines by means of through holes, but in the manufacturing process of the liquid crystal display device, connecting conductive layers at the through holes are frequently burnt due to over-high static electricity. Due to the through hole defect, not only is the antistatic function of the data line shorting bar disabled, but also the electric test cannot be carried out. Therefore, the application provides a liquid crystal display device and a testing method thereof, where the liquid crystal display device eliminates the through holes and thus eliminates the adverse influences of the through hole defects on the liquid crystal display device, ensures smooth operation of the electric test, and can reduce the area occupied by the data lines and can also reduce the switch signal delay of the switch elements.

First Embodiment

For convenience, three scan lines and two data line sets are taken as examples for detailed description below. However, it should be realized that the number of the scan lines and the number of the data lines are not limited thereto.

Figure 2:
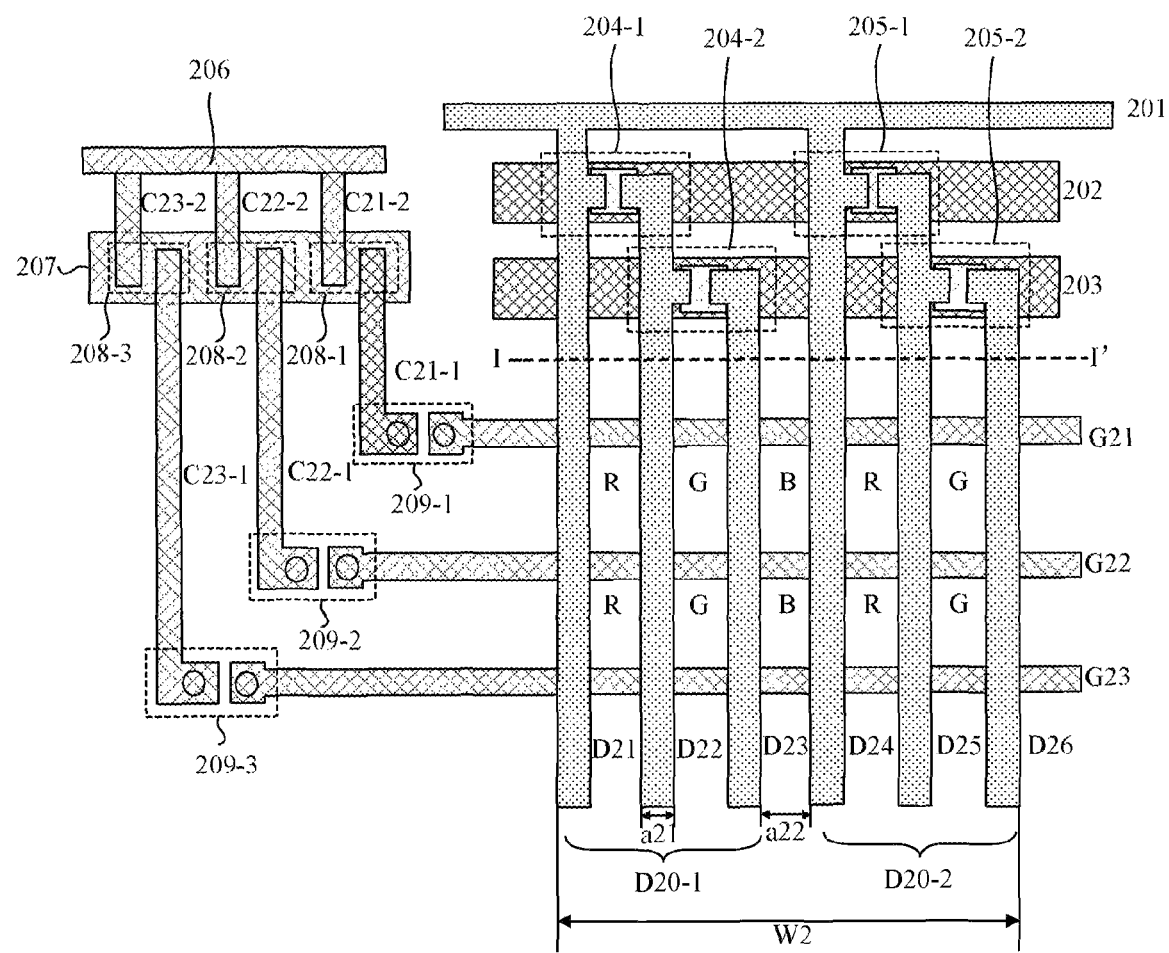
FIG. 2 is a structural schematic diagram of a liquid crystal display device in a first embodiment.

Please refer to FIG. 2, which is a structural schematic diagram of a liquid crystal display device in the first embodiment of the application. As shown in FIG. 2, the liquid crystal display device comprises an effective display area and a test area, where the test area comprises a data line test area and a scan line test area.

The effective display area comprises three scan lines G21, G22 and G23, two data line sets D20-1 and D20-2, and a plurality of pixel units formed in areas near intersections of the three scan lines G21, G22 and G23 with data lines in the two data line sets D20-1 and D20-2. The three scan lines G21, G22 and G23 are parallel to each other and are separated from each other by a fixed interval, and extend along the row direction of the array matrix of the liquid crystal display device. The data line set D20-1 comprises three adjacent data lines D21, D22 and D23; the data line set D20-2 comprises three adjacent data lines D24, D25 and D26. The six data lines D21, D22, D23, D24, D25 and D26 are parallel to each other and are separated from each other by a fixed interval, and extend along the direction vertical to the three scan lines G21, G22 and G23. The six data lines can be made of the same material, and are formed by synchronous film forming, photo-etching and etching in the manufacturing process of the liquid crystal display device.

In this case, D21 and D24 are first data lines, D22 and D25 are second data lines, and D23 and D26 are third data lines.

The pixel units comprise red pixel units, green pixel units and blue pixel units. The pixel units also include a pixel electrode arranged in each pixel unit, where each pixel electrode is connected with a TFT. The TFT selectively conducts under the control of scan line signals and transmit signals from the corresponding data line to the corresponding pixel electrode to thereby control the state of liquid crystal molecules, so that one color or a combination of colors, of three primary colors, namely red, green and blue, is displayed in the display area. The data lines D21 and D24 are red signal data lines and are connected with pixel electrodes R of red pixel units, the data lines D22 and D25 are green signal data lines and are connected with pixel electrodes G of green pixel units, and the data lines D23 and D26 are blue signal data lines and are connected with pixel electrodes B of blue pixel units.

It should be pointed out that in a data line set, the line sequence of respective color signal data lines is not limited thereto, and can be another line sequence. For example, the data lines D21 and D24 are green signal data lines, the data lines D22 and D25 are red signal data line, and the data lines D23 and D26 are blue signal data lines and so on.

The data line test area comprises a data line shorting bar 201, two switch control lines 202 and 203 for the data lines, a first switch element 204-1 and a second switch element 204-2 formed at intersection points of the data line set D20-1 with the switch control lines 202 and 203 for the data lines, and a first switch element 205-1 and a second switch element 205-2 formed at intersection points of the data line set D20-2 with the switch control lines 202 and 203 for the data lines.

In this case, the data switch control line 202 is a first data switch control line, and the data switch control line 203 is a second data switch control line.

Gate electrodes of the two first switch elements 204-1 and 205-1 are both arranged on the switch control line 202 for the data line, and gate electrodes of the two second switch elements 204-2 and 205-2 are both arranged on the data switch control line 203. Source electrodes of the first switch elements 204-1 and 205-1 are directly connected with the data line shorting bar 201, and source electrodes of the second switch elements 204-2 and 205-2 are connected with the data line shorting bar 201 through the first switch elements 204-1 and 205-1. Drain electrodes of the first switch elements 204-1 and 205-1 are arranged on the data switch control line 202 and connected with the data lines D22 and D25, and drain electrodes of the second switch elements 204-2 and 205-2 are arranged on the switch control line 203 for the data line and connected with the data lines D23 and D26. The first switch elements 204-1 and 205-1 and the second switch elements 204-2 and 205-2 in the embodiment are all thin film transistor switch elements, the switch control line 202 for the data line is used for controlling connection and disconnection of the two first switch elements 204-1 and 205-1, and similarly, the switch control line 203 for the data line is used for controlling connection and disconnection of the two second switch elements 204-2 and 205-2.

In this case, the gate electrodes of the first switch elements 204-1 and 205-1 are arranged on the switch control line 202 for the data line and connected with the switch control line 202 for the data line, and specifically, the data switch control line 202 can be used as the gate electrodes of the first switch elements 204-1 and 205-1.

The gate electrodes of the second switch elements 204-2 and 205-2 are arranged on the data switch control line 203 and connected with the data switch control line 203, and specifically, the data switch control line 203 can be used as the gate electrodes of the second switch elements 204-2 and 205-2.

The source electrodes of the second switch elements 204-2 and 205-2 are connected with the data line shorting bar 201 through the first switch elements 204-1 and 205-1, and specifically, the source electrode of the second switch element 204-2 is connected with the drain electrode of the first switch element 204-1, and thus connected with the data line shorting bar 201 through the first switch element 204-1; and the source electrode of the second switch element 205-2 is connected with the drain electrode of the first switch element 205-1, and thus connected with the data line shorting bar 201 through the first switch element 205-1.

The drain electrodes of the first switch elements 204-1 and 205-1 are arranged on the data switch control line 202 and insulated with the switch control line 202 for the data line, and the drain electrodes of the second switch elements 204-2 and 205-2 are arranged on the data switch control line 203 and insulated with the data switch control line 203.

The scan line test area comprises a scan line shorting bar 206, a switch control line 207 for the scan lines, three switch elements 208-1, 208-2 and 208-3 for the scan lines, three first connecting lines C21-1, C22-1 and C23-1 for the scan lines and three second connecting lines C21-2, C22-2 and C23-2 for the scan lines. Gate electrodes of the three switch elements 208-1, 208-2 and 208-3 for the scan lines are all arranged on the switch control line 207 for the scan lines. Source electrodes of the three switch elements 208-1, 208-2 and 208-3 for the scan lines are respectively connected with the scan line shorting bar 206 through the second connecting lines C21-2, C22-2 and C23-2. Drain electrodes of the three switch elements 208-1, 208-2 and 208-3 for the scan lines are arranged on the switch control line 207 for the scan lines and are respectively connected with three scan lines G21, G22 and G23 through the three first connecting lines C21-1, C22-1 and C23-1.

In this case, the gate electrodes of the three switch elements 208-1, 208-2 and 208-3 for the scan lines are all arranged on the switch control line 207 for the scan lines, and specifically, the switch control line 207 for the scan lines is used as the gate electrode of respective switch elements for the scan lines.

The drain electrodes of the three switch elements 208-1, 208-2 and 208-3 for the scan lines are arranged on the switch control line 207 for the scan lines and insulated with the switch control line 207 for the scan lines.

In the embodiment, because the three scan lines G21, G22 and G23 and the three first connecting lines C21-1, C22-1 and C23-1 for the scan lines are formed in different conductive layers, the first connecting lines C21-1, C22-1 and C23-1 for the scan lines are connected with the three scan lines G21, G22 and G23 through three through holes 209-1, 209-2 and 209-3 respectively. Generally, after an array substrate is aligned with a color film substrate, the through holes 209-1, 209-2 and 209-3 of the scan line test area are generally packaged in frame sealing glue of the array substrate and the color film substrate, so static electricity is difficultly produced at these through holes. Connecting metals (such as ITO or IZO) at these through holes are difficultly to be burnt, and thus the through holes in the scan line test area are not damaged in the embodiment. It can be understood that the through holes and the connecting lines for the scan lines can be replaced by switch elements in the scan line test area, to thereby save the area occupied by the scan line test area. Variations made by those skilled in the art according to the description of the data line test area without inventive work should belong to the protective scope of the application.

It should be pointed out that the switch elements 208-1, 208-2 and 208-3 for the scan lines can also be eliminated, so that the scan lines G21, G22 and G23 are directly electrically connected with the first connecting lines C21-1, C22-1 and C23-1, the second connecting lines C21-2, C22-2 and C23-2, and the scan line shorting bar 206 through the through holes 209-1, 209-2 and 209-3. Although in the connecting mode, the connections of the scan line shorting bar 206 with respective scan lines G21, G22 and G23 are to be cut off by using laser after the test is completed to facilitate drive circuit module assembly of the next step, the procedure of making the switch elements for the scan lines is reduced in this mode.

In this case, the switch elements 208-1, 208-2 and 208-3 for the scan lines are eliminated, so that the scan lines G21, G22 and G23 can be directly electrically connected with the first connecting lines C21-1, C22-1 and C23-1, the second connecting lines C21-2, C22-2 and C23-2, and the scan line shorting bar 206 through the through holes 209-1, 209-2 and 209-3. This is because the switch elements 208-1, 208-2 and 208-3 for the scan lines are eliminated, so that the second connecting lines C21-2, C22-2 and C23-2 for the scan lines are directly connected with the scan line shorting bar 206.

In the embodiment, none of the data line shorting bar 201, the scan line shorting bar 206, the switch control lines 202 and 203, and the switch control line 207 for the scan lines are connected with test terminals, so test signals can be directly applied to the data line shorting bar 201, the scan line shorting bar 206, the data switch control lines 202 and 203 and the switch control line 207 for the scan lines. However, it should be realized that the data line shorting bar 201, the scan line shorting bar 206, the switch control lines 202 and 203, and the switch control line 207 for the scan lines can also be connected with the test terminals, and the test terminals can be made of the same materials as or different materials from the data line shorting bar 201, the scan line shorting bar 206, the switch control lines 202 and 203, and the switch control line 207 for the scan lines. In addition, a plurality of test terminals can be made of the same or different materials, for example, one part of the test terminals can be made of molybdenum, while the other part of the test terminals can be made of aluminum or aluminum alloy.

According to above description, the data lines D21 and D24 are directly connected with the data line shorting bar 201, the data lines D22 and D24 are electrically connected with the data line shorting bar 201 through the first switch elements 204-1 and 205-1 respectively, and the data lines D23 and D26 are electrically connected with the data line shorting bar 201 through the first switch elements 204-1 and 205-1 and the second switch element 204-2 and 205-2 respectively. In addition, two data switch control lines 202 and 203 are provided, where each data switch control line is connected with two switch elements, the data lines corresponding to the two switch elements on the same data switch control line correspond to pixel electrodes with the same color, and the liquid crystal display device can display pictures with different colors by applying corresponding control signals to the two data switch control lines 202 and 203 without the need of through holes. As a result, the adverse influences of the through hole defect on the liquid crystal display device are eliminated, and smooth operation of the electric test is ensured.

Figure 1:
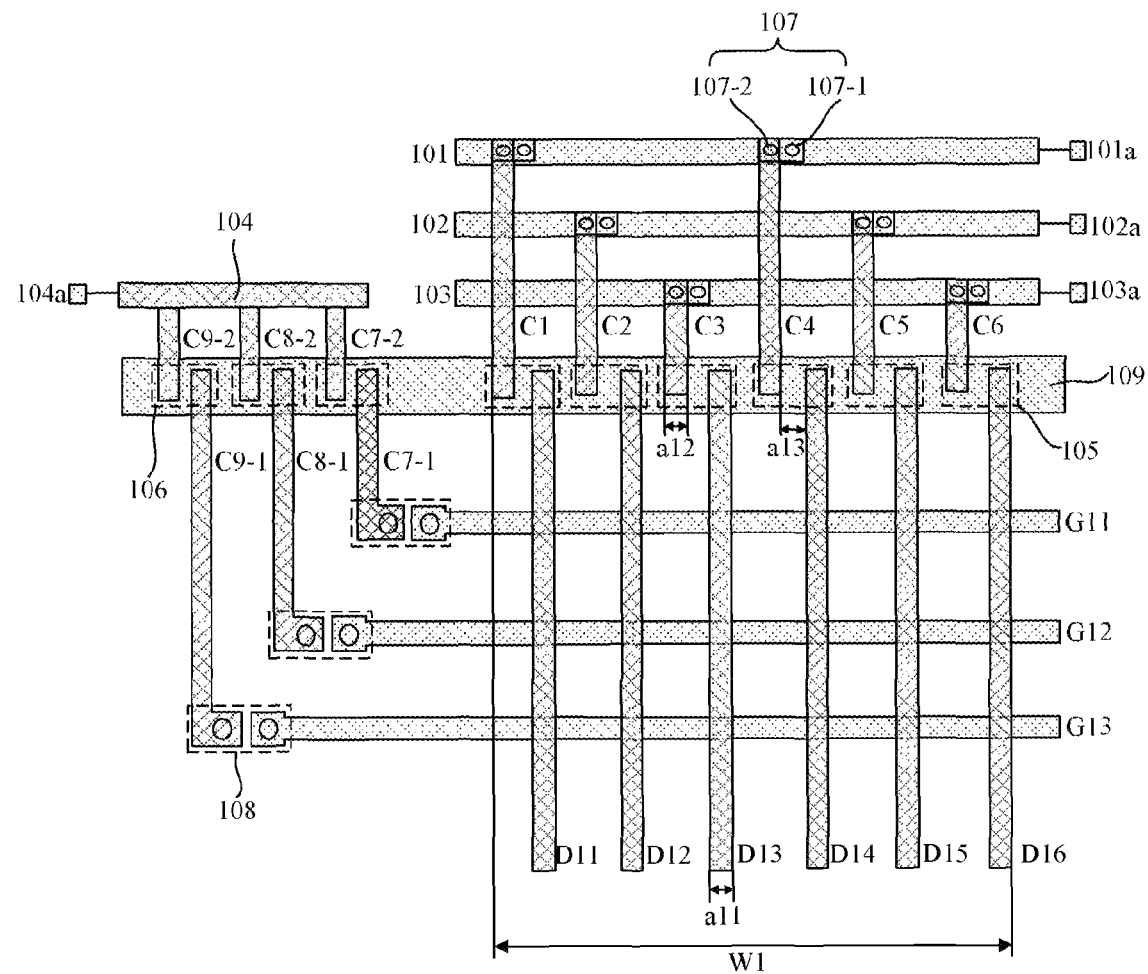
FIG. 1 is a schematic diagram of a liquid crystal display device.

Moreover, as in shown FIG. 1, in liquid crystal display devices of the prior art, if line widths of the data lines D11, D12, D13, D14, D15 and D16 are all a11, line widths of the connecting lines C1, C2, C3, C4, C5 and C6 are all a12 and distances between the connecting lines and adjacent data lines are a13, and the distance W1 between the connecting line C1 and the data line D16 is 6*a11+6*a12+11*a13; and if a11=a12=a13=a, then W1=23a. In the embodiment, if line widths of the data lines D21, D22, D23, D24, D25 and D26 are all a21 and distances between adjacent data lines are a22, then the distance W2 between the data line D21 and the data line D26 is 6*a21+5*a22, and if a21=a22=a, then W2=11a. Compared with the prior art, in the embodiment, the width of the data line test area, which can be reduced, is W1−W2=12a. It can be seen that in comparison with the prior art, in the embodiment, the area occupied by the data line test area is reduced, thereby facilitating the production of small-sized liquid crystal display devices. Moreover, compared with the prior art, in the embodiment, the number of the data lines superposed with each data switch control line is reduced, thereby reducing the switch signal delay of the switch elements.

The application further provides a testing method for the liquid crystal display device. The testing method comprises:

S1: providing a start voltage signal to the switch control line for the scan lines, the scan line shorting bar and the data switch control lines, and providing a data voltage signal to the data line shorting bar, so that the liquid crystal display device displays black pictures or white pictures.

In the condition that the liquid crystal display device displays the black pictures or the white pictures, the testing method includes executing step S2: providing a start voltage signal to the switch control line for the scan lines and the scan line shorting bar, and regulating data voltage signals on the plurality of data switch control lines and the data line shorting bar, so that the liquid crystal display device displays pictures with different colors.

The liquid crystal display device in a normally white mode is taken as an example below to describe the testing method for the liquid crystal display device according to the embodiment in detail.

1) Detecting Red Pictures

Figure 3:
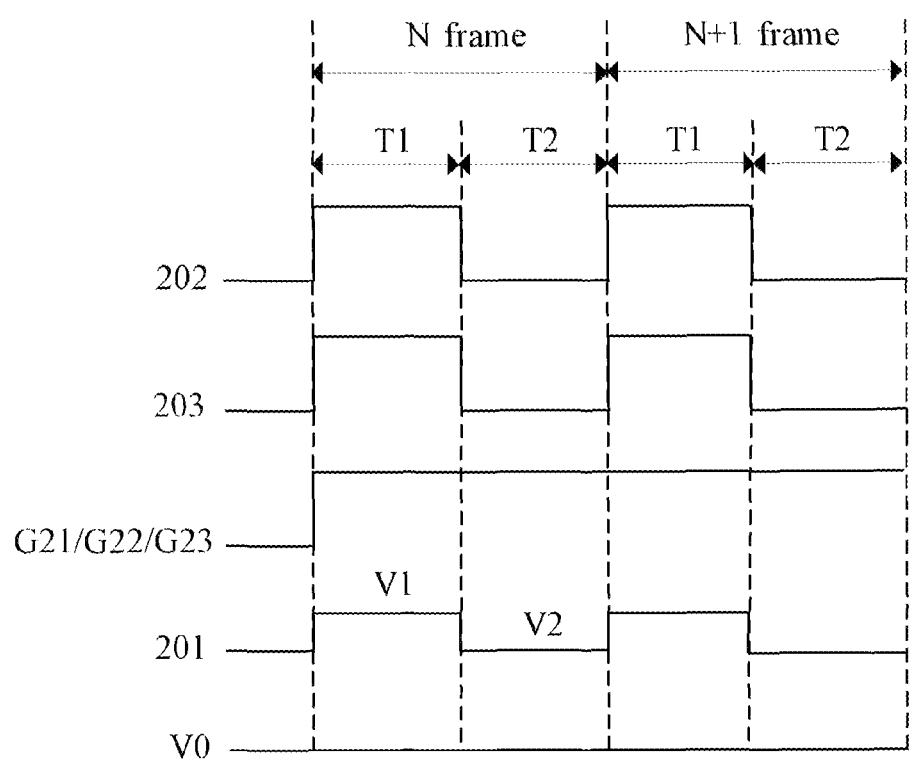
FIG. 3 is a flowchart diagram showing when the liquid crystal display device displays red pictures in the first embodiment.

Please refer to FIG. 2 and FIG. 3, where FIG. 3 is a timing diagram showing when the liquid crystal display device displays red pictures in the first embodiment of the application. As shown in FIG. 3, in a time period of one frame (comprising a time period T1 and a time period T2), the method comprises the following testing steps:

During time period T1, providing a start voltage signal (for example, 15V) to the switch control line 207, the scan line shorting bar 206, and the switch control lines 202 and 203 to turn on the first switch elements 204-1 and 205-1 and the second switch elements 204-2 and 205-2 and also to turn on the thin film transistors in all the pixel units in the effective display area. The method also includes, during time period T1, providing a first voltage V1 (for example, 5V) greater than a common electrode voltage V0 (for example, 0V) to the data line shorting bar 201, so that the liquid crystal display device displays black pictures.

The method also includes, during time period T2, providing a start voltage signal to the switch control line 207 and the scan line shorting bar 206, to make signals on the three scan lines G21, G22 and G23 be the start voltage signal and thus turn on the thin film transistors in all the pixel units in the effective display area. The method also includes, during time period T2, providing a cut-off voltage to the switch control lines 202 and 203, so that the two first switch elements 204-1 and 205-1 and the two second switch elements 204-2 and 205-2 are all in a cut-off state, and providing a second voltage V2 (for example, 0.01V) close to the common electrode voltage V0 to the data line shorting bar 201, and applying signals of the second voltage V2 to the corresponding red pixel electrodes R through the red signal data lines D21 and D24, so that light can penetrate the red pixel units, and red pictures are displayed in the display area of the liquid crystal display device. Therefore, the red pictures can be detected.

2) Detecting Green Pictures

Figure 4:
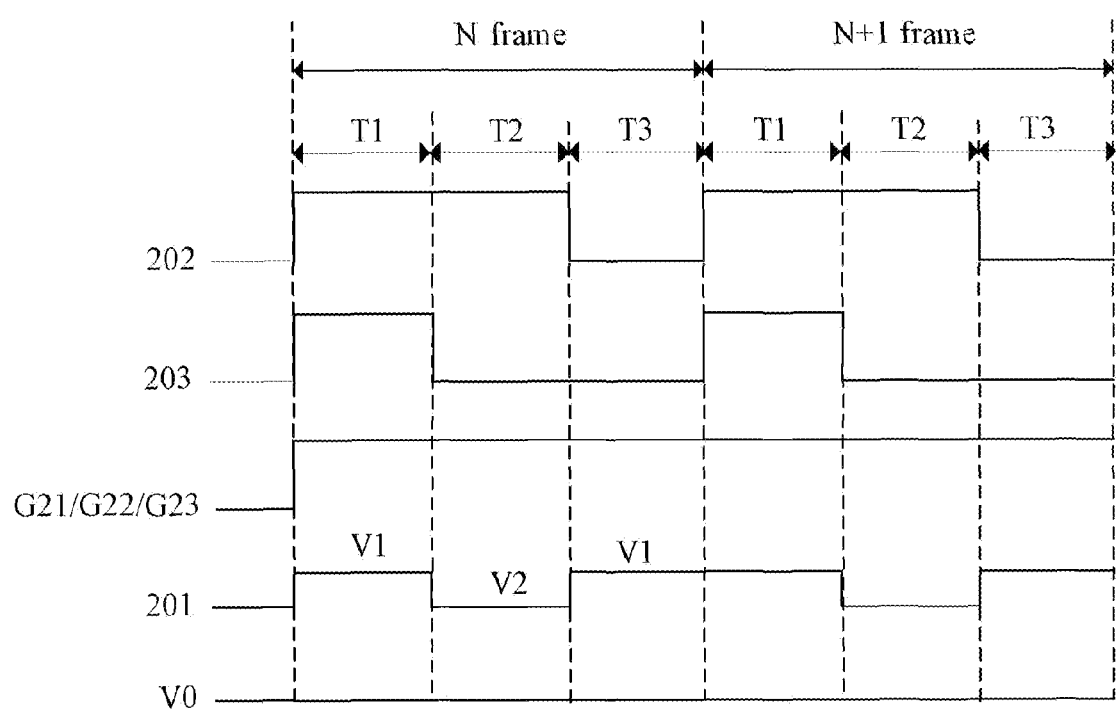
FIG. 4 is a flowchart diagram showing when the liquid crystal display device displays green pictures in the first embodiment.

Please refer to FIG. 4, which is a timing diagram showing when the liquid crystal display device displays green pictures in the first embodiment of the application. As shown in FIG. 4, in a time period of one frame (comprising a time period T1, a time period T2 and a time period T3), the method comprises the following testing steps:

During time period T1, providing a start voltage signal (for example, 15V) to the switch control line 207, the scan line shorting bar 206 and the switch control lines 202 and 203, to turn on all of the two first switch elements 204-1 and 205-1 and the two second switch elements 204-2 and 205-2 and also to turn on the thin film transistors in all the pixel units in the effective display area. The method also includes, during time period T1, providing a first voltage V1 (for example, 5V) greater than a common electrode voltage V0 (for example, 0V) to the data line shorting bar 201, so that the liquid crystal display device displays black pictures.

The method also includes, during time period T2, providing a start voltage signal to the switch control line 207 and the scan line shorting bar 206, to make signals on the three scan lines G21, G22 and G23 be the start voltage signal and thus turn on the thin film transistors in all the pixel units in the effective display area. The method also includes, during time period T2, providing a cut-off voltage signal to the switch control line 203, so that the two second switch elements 204-2 and 205-2 are both in a cut-off state, simultaneously providing a start voltage signal to the data switch control line 202, so that the two first switch elements 204-1 and 205-1 are in a turn-on state, and providing a second voltage V2 (for example, 0.01V) close to the common electrode voltage V0 to the data line shorting bar 201, so that light can penetrate the red pixel units and the green pixel units.

The method also includes, during time period T3, providing a start voltage signal to the switch control line 207 and the scan line shorting bar 206, to turn on the thin film transistors in all the pixel units in the effective display area. The method also includes, during time period 3, providing a cut-off voltage to the switch control lines 202 and 203, so that the two first switch elements 204-1 and 205-1 and the two second switch elements 204-2 and 205-2 are all in a cut-off state, and providing the first voltage V1 greater than the common electrode voltage V0 to the data line shorting bar 201, so that light cannot penetrate the red pixel units, and finally green pictures are displayed in the display area of the liquid crystal display device. Therefore, the green pictures can be detected.

3) Detecting Blue Pictures

Figure 5:
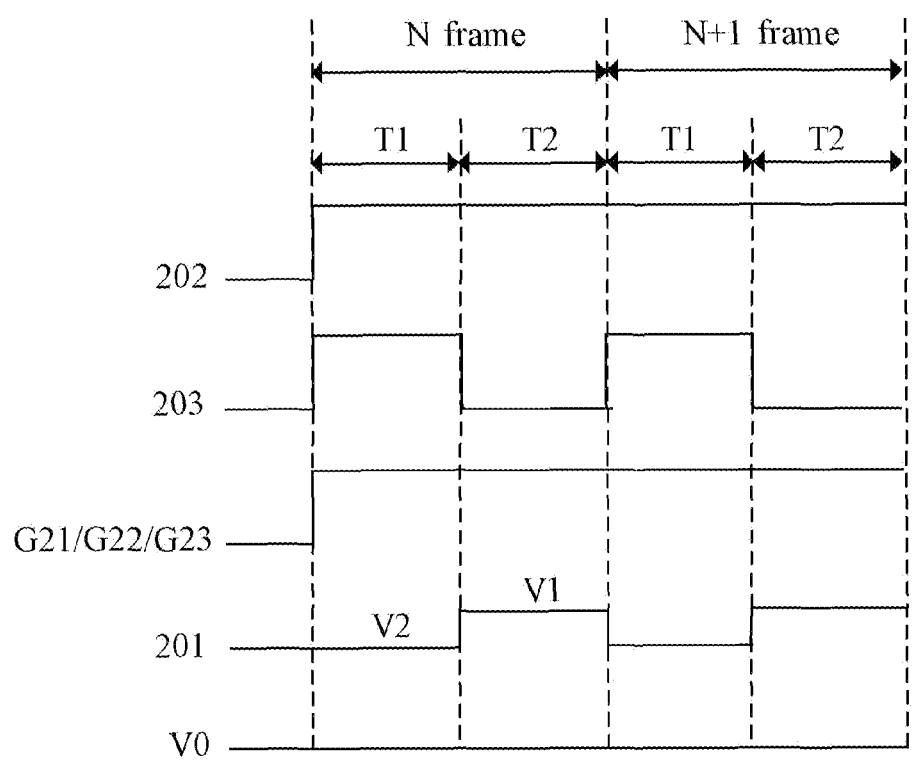
FIG. 5 is a flowchart diagram showing when the liquid crystal display device displays blue pictures in the first embodiment.

Please refer to FIG. 5, which is a diagram showing when the liquid crystal display device displays the blue pictures in the first embodiment of the application. As shown in FIG. 5, in a time period of one frame (comprising a time period T1 and a time period T2), the method comprises the following testing steps:

During time period T1, providing a start voltage signal (for example, 15V) to the switch control line 207, the scan line shorting bar 206 and the switch control lines 202 and 203, to turn on the two first switch elements 204-1 and 205-1 and the two second switch elements 204-2 and 205-2 and also to turn on thin film transistors in all the pixel units in the effective display area. method also includes, during time period T1, providing the second voltage V2 close to the common electrode voltage V0 to the data line shorting bar 201, so that the liquid crystal display device displays white pictures.

The method also includes, during time period T2, providing a start voltage signal to the switch control line 207 and the scan line shorting bar 206, to make signals on the three scan lines G21, G22 and G23 be the start voltage signal and thus to turn on the thin film transistors in all the pixel units in the effective display area. The method also includes, during time period T2, providing a cut-off voltage to the switch control line 203, so that the two second switch elements 204-2 and 205-2 are both in a cut-off state, and providing a start voltage to the switch control line 202, so that the two first switch elements 204-1 and 205-1 are both in a turn-on state. The method also includes during time period T2, providing the first voltage V1 greater than the common electrode voltage V0 to the data line shorting bar 201, so that light cannot penetrate the red pixel units and the green pixel units. As a result, blue pictures are displayed in the display area of the liquid crystal display device. Therefore, the blue pictures can be detected.

4) Detecting Black Pictures

Black pictures may be produced using a method including providing a start voltage signal (for example, 15V) to the switch control line 207, the scan line shorting bar 206 and the switch control lines 202 and 203, to turn on the two first switch elements 204-1 and 205-1 and the two second switch elements 204-2 and 205-2, and also to turn on thin film transistors in all the pixel units in the effective display area. The method also includes providing a first voltage V1 (for example, 5V) greater than a common electrode voltage V0 (for example, 0V) to the data line shorting bar 201, so that the liquid crystal display device displays black pictures. As a result, line defects can be detected.

5) Detecting White Pictures

White pictures may be produced using a method including providing a start voltage signal (for example, 15V) to the switch control line 207, the scan line shorting bar 206 and the switch control lines 202 and 203, to turn on the two first switch elements 204-1 and 205-1 and the two second switch elements 204-2 and 205-2, and also to turn on thin film transistors in all the pixel units in the effective display area. The method also includes providing the second voltage V2 close to the common electrode voltage V0 to the data line shorting bar 201, so that the liquid crystal display device displays white pictures. As a result, line defects can be detected.

With respect to the above several conditions, when the red, green and blue pictures are to be switched, for example, when the red pictures are required to be switched into the green pictures, firstly a start voltage control signal is provided to the switch control lines 202 and 203, and a signal of the first voltage V1 greater than the common electrode voltage V0 is provided to the data line shorting bar 201, so that the black pictures are displayed in the effective display area. Then a start voltage signal is provided to the switch control line 202, and the second voltage V2 close to the common electrode voltage V0 is provided to the data line shorting bar 201. In addition, a cut-off voltage is provided to the switch control lines 202 and 203, and the first voltage V1 greater than the common electrode voltage V0 is provided to the data line shorting bar 201, so that the green pictures are displayed in the effective display area of the liquid crystal display device. Thus, the switching from the red pictures to the green pictures is realized. The switching modes between every two of the red, green and blue pictures are similar. When the black and grey pictures are required to be switched, only the voltage signal of the data line shorting bar need be regulated.

In conclusion, in the testing method for the liquid crystal display device provided in the embodiment, the liquid crystal display device can display pictures with various colors such as red, green, blue, black, white and grey by regulating the voltage signals on the plurality of data switch control lines, the switch control line for the scan lines, the data line shorting bar and the scan line shorting bar. Moreover, through holes are eliminated in the data line test area of the liquid crystal display device, so line defects of the scan lines or the data lines due to the through holes are eliminated in the test process, thereby increasing the testing efficiency, reducing the area occupied by the data line test area, and also reducing the switch signal delay of the switch elements.

In the above first embodiment, each data line set comprises three data lines for controlling the pixel units of three colors respectively. Further, each data line set can also comprise four data lines for controlling the pixel units of red, green, blue and white respectively. Correspondingly, the liquid crystal display device comprises three data switch control lines.

Such embodiments include a third data switch control line, and each data line set further comprises a fourth data line. The third data switch control line intersects with the fourth data line in each data line set, and a third switch element is formed at each intersection point. A gate electrode of the third switch element is arranged on the third data switch control line, a source electrode of the third switch element is connected with the data line shorting bar through the second switch element, and a drain electrode of the third switch element is connected with the fourth data line at the intersection point.

In this case, the gate electrode of the third switch element is arranged on the third data switch control line and is connected with the third data switch control line. In addition, the source electrode of the third switch element is connected with the data line shorting bar through the second switch element, that is, the source electrode of the third switch element is connected with the drain electrode of the second switch element, and the source electrode of the second switch element is connected with the drain electrode of the first switch element, so that the third switch element is connected with the data line shorting bar.

Second Embodiment

In the first embodiment, after the test is completed, the connections of the data line shorting bar 201 with the data lines D21, D22, D23, D24, D25 and D26 are cut off by using laser along the line I-I' direction as shown in FIG. 2 to facilitate drive circuit module assembly in the next step. Such laser cutting is not necessary in the second embodiment. The second embodiment provides a liquid crystal display device, where the liquid crystal display device comprises three data switch control lines, where each data line set comprises three data lines. The second embodiment includes switch elements (a first switch element, a second switch element and a third switch element) which are formed at intersections of each data line set and the three data switch control lines. All the data lines in the embodiment are connected with the data line shorting bar through the switch elements and the connecting lines, and none are directly connected with the data line shorting bar, so laser cutting is not required after the test is completed.

For convenience, three scan lines and two data line sets are taken as examples for detailed description below, but it should be realized that the number of the scan lines and the number of the data lines are not limited thereto.

Figure 6:
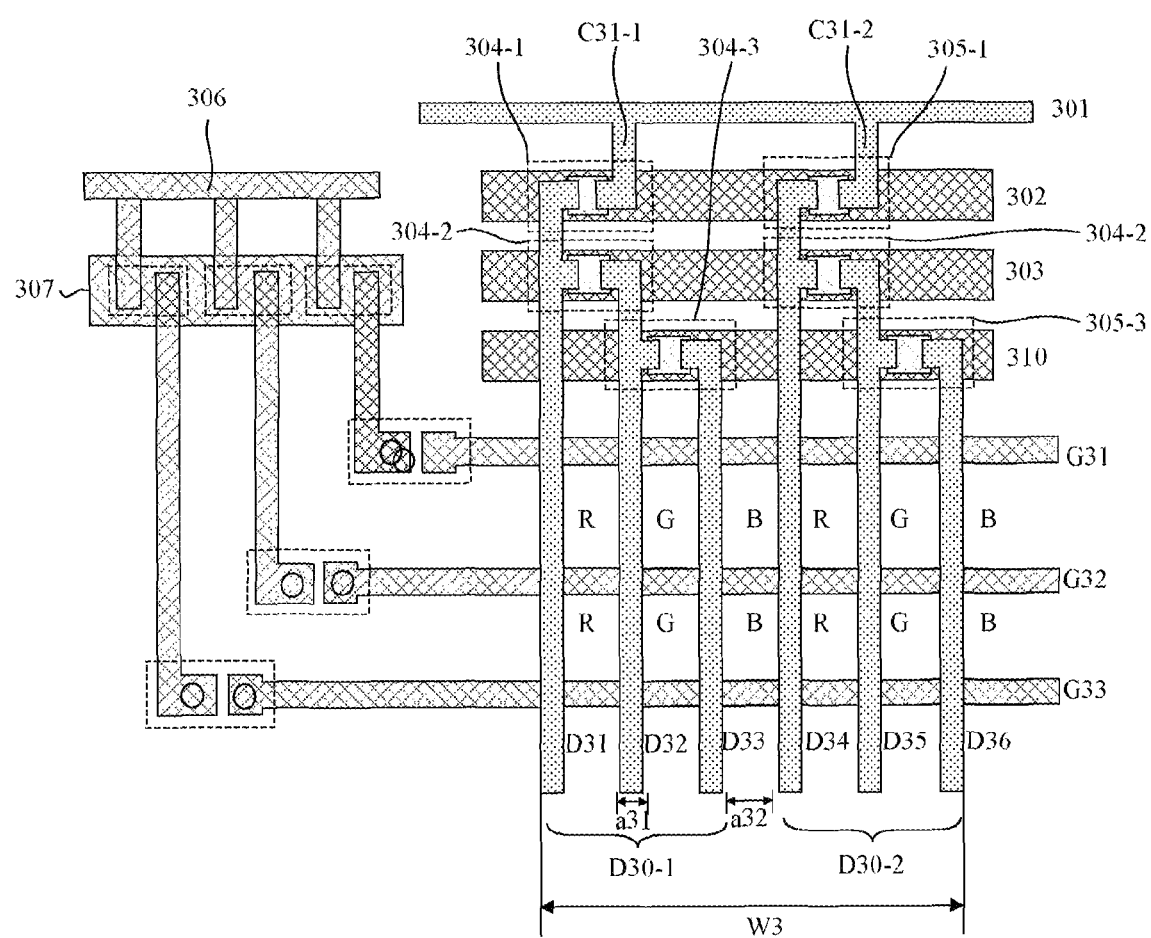
FIG. 6 is a structural schematic diagram of a liquid crystal display device in a second embodiment.

Specifically refer to FIG. 6, which is a schematic diagram of a liquid crystal display device of the second embodiment of the application. An effective display area of the liquid crystal display device comprises three scan lines G31, G32 and G33, two data line sets D30-1 and D30-2, and a plurality of pixel units formed in areas encircled by intersecting the three scan lines G31, G32 and G33 with respective data lines in the two data line sets D30-1 and D30-2, wherein the data line set D30-1 comprises three adjacent data lines D31, D32 and D33; and the data line set D30-2 comprises three adjacent data lines D34, D35 and D36, wherein the data lines D31 and D34 are red signal data lines and are connected with pixel electrodes R of the red pixel units; the data lines D32 and D35 are green signal data lines and are connected with pixel electrodes G of the green pixel units; and the data lines D33 and D36 are blue signal data lines and are connected with pixel electrodes B of the blue pixel units.

In this case, D31 and D34 are first data lines, D32 and D35 are second data lines, and D33 and D36 are third data lines.

It should be pointed out that in one data line set, the line sequence of respective color signal data lines is not limited thereto, and can be other sequence. For example, the data lines D31 and D34 are green signal data lines, the data lines D32 and D35 are red signal data lines, the data lines D33 and D36 are blue signal data lines and so on.

The data line test area of the liquid crystal display device comprises a data line shorting bar 301, three data switch control lines 302, 303 and 310, a first switch element 304-1, a second switch element 304-2 and a third switch element 304-3 formed at intersection points of the data line set D30-1 and the switch control lines 302, 303 and 310 for the data lines, and a first switch element 305-1, a second switch element 305-2 and a third switch element 305-3 formed at intersection points of the data line set D30-2 and the data switch control lines 302, 303 and 310.

In this case, the data switch control line 302 is a first data switch control line, the data switch control line 303 is a second data switch control line, and the data switch control line 310 is a third data switch control line.

Gate electrodes of the two first switch elements 304-1 and 305-1 are arranged on the data switch control line 302, gate electrodes of the two second switch elements 304-2 and 305-2 are arranged on the data switch control line 303, and gate electrodes of the two third switch elements 304-3 and 305-3 are arranged on the data switch control line 310.

Source electrodes of the two first switch elements 304-1 and 305-1 are connected with the data line shorting bar 301 through connecting lines C31-1 and C31-2;

Source electrodes of the two second switch elements 304-2 and 305-2 are connected with the data line shorting bar 301 through the two first switch elements 304-1 and 305-1 and the connecting lines C31-1 and C31-2, and the source electrode of the second switch element 304-2 is connected with the drain electrode of the first switch element 304-1, so as to be connected with the data line shorting bar 301 through the first switch element 304-1 and the connecting line C31-1. In addition, the source electrode of the second switch element 305-2 is connected with the drain electrode of the first switch element 305-1, so as to be connected with the data line shorting bar 301 through the first switch element 305-1 and the connecting line C31-2.

Source electrodes of the two third switch elements 304-3 and 305-3 are connected with the data line shorting bar 301 through the two first switch elements 304-1 and 305-1, the two second switch elements 304-2 and 305-2 and the connecting lines C31-1 and C31-2, and the source electrode of the third switch element 304-3 is connected with the drain electrode of the second switch element 304-2, so as to be connected with the data line shorting bar 301 through the first switch element 304-1, the second switch element 304-2, and the connecting line C31-1. The source electrode of the third switch element 305-3 is connected with the drain electrode of the second switch element 305-2, so as to be connected with the data line shorting bar 301 through the first switch element 305-1, the second switch element 305-2, and the connecting line C32-1.

Drain electrodes of the first switch elements 304-1 and 305-1 are arranged on the data switch control line 302 and insulated with the data switch control line 302. Drain electrodes of the second switch elements 304-2 and 305-2 are arranged on the data switch control line 303 and insulated with the data switch control line 303, and drain electrodes of the third switch elements 304-3 and 305-3 are arranged on the switch control line 310 for the data line and insulated with the data switch control line 310.

The drain electrodes of the two first switch elements 304-1 and 305-1 are connected with the data lines D31 and D34 respectively. The drain electrodes of the two second switch elements 304-2 and 305-2 are connected with the data lines D32 and D35 respectively, and the drain electrodes of the two third switch elements 304-3 and 305-3 are connected with the data lines D33 and D36 respectively.

The data switch control line 302 is used for controlling connection and disconnection of the first switch elements 304-1 and 305-1. In addition, the data switch control line 303 is used for controlling connection and disconnection of the second switch elements 304-2 and 305-2, and the data switch control line 310 is used for controlling connection and disconnection of the third switch elements 304-3 and 305-3. The scan line test area of the embodiment may be the same as that of the first embodiment.

In the embodiment, none of the data line shorting bar, the scan line shorting bar, the data switch control lines and the switch control line for the scan lines are connected with test terminals, so test signals can be directly applied to the data line shorting bar, the scan line shorting bar, the data switch control lines and the switch control line for the scan lines. However, it should be realized that the data line shorting bar, the scan line shorting bar, the data switch control lines and the switch control line for the scan lines can also be connected with the test terminals, and the test terminals can be made of the same materials as or different materials from the data line shorting bar, the scan line shorting bar, the data switch control lines and the switch control line for the scan lines. In addition, a plurality of test terminals can be made of the same or different materials, for example, one part of the test terminals can be made of molybdenum, while the other part of the test terminals can be made of aluminum or aluminum alloy.

All the data lines in the embodiment are connected with the data line shorting bar through the switch elements and the connecting lines and none are directly connected with the data line shorting bar, so laser cutting is not required after the test is completed. Moreover, through holes are not required by the liquid crystal display device, so that the adverse influences of the through hole defect on the liquid crystal display device are eliminated, and smooth operation of the electric test can be ensured.

Moreover, as shown in FIG. 6, in the embodiment, if line widths of the data lines D31, D32, D33, D34, D35 and D36 are a31 and distances between adjacent data lines are a32, then the distance W3 between the data line D31 and the data line D36 is 6*a31+5*a32; and if a31=a32=a, then W3=11a. Compared with the prior art, in the embodiment, the width of the data line test area, which can be reduced, is W1−W3=12a. It can be seen that in the embodiment, the area occupied by the data line test area is reduced, thereby facilitating the production of small-sized liquid crystal display devices. Moreover, compared with the prior art, in the embodiment, the number of the data lines superposed with each data switch control line is reduced, thereby reducing the switch signal delay of the switch elements.

The liquid crystal display device in a normally white mode is taken as an example below to describe the testing method for the liquid crystal display device according to the embodiment in detail.

1) Detecting Red Pictures

Figure 7:
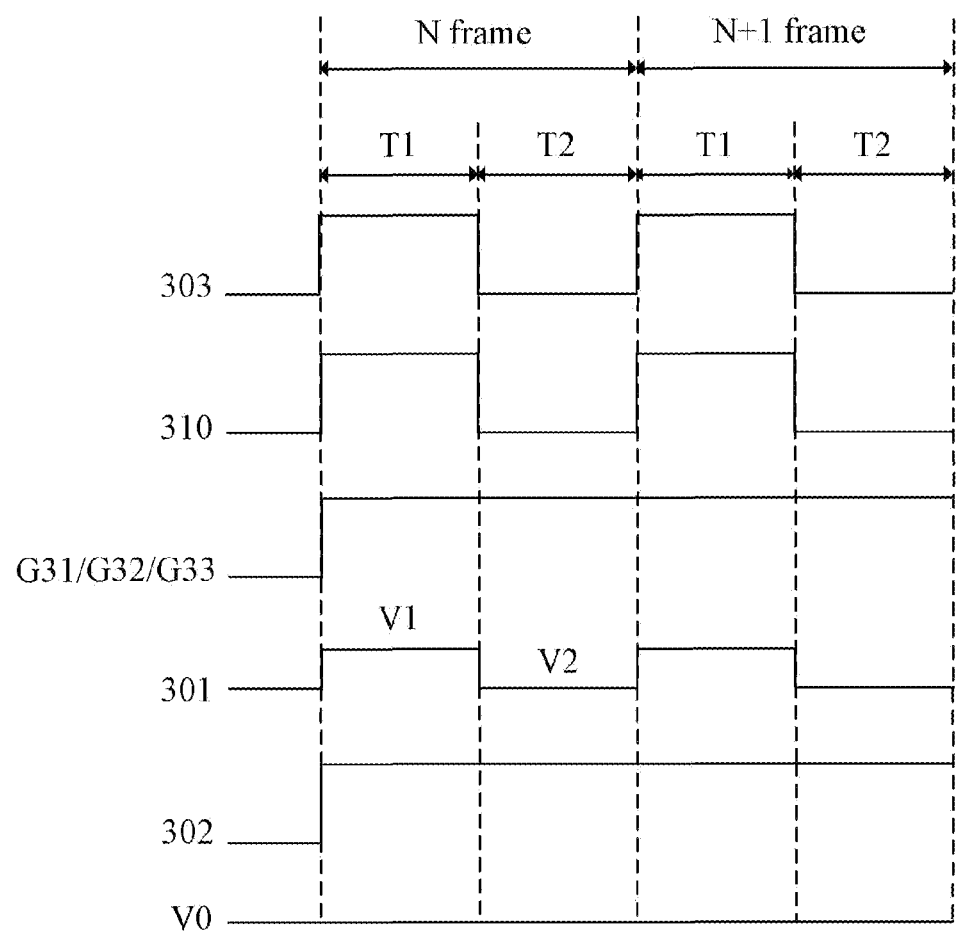
FIG. 7 is a flowchart diagram showing when the liquid crystal display device displays red pictures in the second embodiment.

Please refer to FIG. 7, which is a timing diagram showing when the liquid crystal display device displays red pictures in the second embodiment of the application. As shown in FIG. 7, in a time period of one frame (comprising a time period T1 and a time period T2), the method comprises the following testing steps:

During the time period T1, providing a start voltage signal (for example, 15V) to the switch control line 307, the scan line shorting bar 306 and the switch control lines 302, 303 and 310, to turn on all of the two first switch elements 304-1 and 305-1, the two second switch elements 304-2 and 305-2, and the two third switch elements 304-3 and 305-3, and also to turn on thin film transistors in all the pixel units in the effective display area. The method also includes, during time period T1, providing a first voltage V1 (for example, 5V) greater than a common electrode voltage V0 (for example, 0V) to the data line shorting bar 301, so that the liquid crystal display device displays black pictures.

The method also includes, during time period T2, providing a start voltage signal to the switch control line 307 for the scan lines and the scan line shorting bar 306, to make signals on the three scan lines G31, G32 and G33 be all high voltage signals and thus to turn on the thin film transistors in all the pixel units in the effective display area. The method also includes, during time period T2, providing a cut-off voltage to the switch control lines 303 and 310, so that the second switch elements 304-2 and 305-2 and the third switch elements 304-3 and 305-3 are all in a cut-off state, and providing a start voltage to the switch control lines 302, so that the first switch elements 304-1 and 305-1 are in a turn-on state. The method also includes, during time period T2, providing a second voltage V2 (for example, 0.01V) close to the common electrode voltage V0 to the data line shorting bar 301, and applying signals of the second voltage V2 to the red pixel electrodes through the red signal data lines D31 and D34, so that light can penetrate the red pixel units, and the red pictures are displayed in the display area of the liquid crystal display device. Therefore, the red pictures can be detected.

2) Detecting Green Pictures

Figure 8:
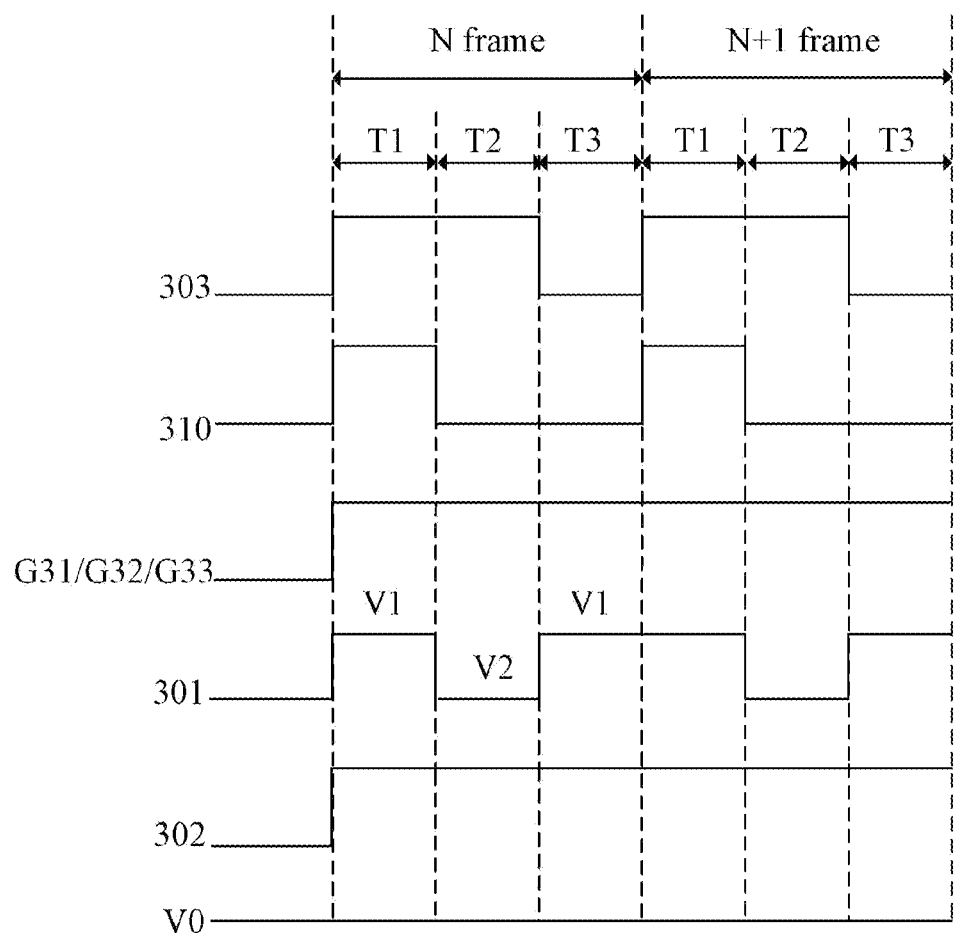
FIG. 8 is a flowchart diagram showing when the liquid crystal display device displays green pictures in the second embodiment.

Please refer to FIG. 8, which is a timing diagram showing when the liquid crystal display device displays green pictures in the second embodiment of the application. As shown in FIG. 8, in a time period of one frame (comprising a time period T1, a time period T2 and a time period T3), the method comprises the following testing steps:

During time period T1, providing a start voltage signal (for example, 15V) to the switch control line 307, the scan line shorting bar 306 and the switch control lines 302, 303 and 310, to turn on all of the two first switch elements 304-1 and 305-1, the two second switch elements 304-2 and 305-2, and the two third switch elements 304-3 and 305-3, and also to turn on thin film transistors in all the pixel units in the effective display area. The method also includes, during time period T1 providing a first voltage V1 (for example, 5V) greater than a common electrode voltage V0 (for example, 0V) to the data line shorting bar 301, so that the liquid crystal display device displays black pictures;

The method also includes, during time period T2, providing a start voltage signal to the switch control line 307 and the scan line shorting bar 306, to make signals on the three scan lines G31, G32 and G33 be the start voltage signal and thus to turn on the thin film transistors in all the pixel units in the effective display area. The method also includes, during time period T2, providing a cut-off voltage signal to the switch control line 310, so that the two third switch elements 304-3 and 305-3 are both in a cut-off state, and providing a start voltage signal to the switch control lines 302 and 303, so that the two first switch elements 304-1 and 305-1 and the two second switch elements 304-2 and 305-2 are all in a turn-on state. The method also includes, during time period T2, providing a second voltage V2 (for example, 0.01V) close to the common electrode voltage V0 to the data line shorting bar 301, so that light can penetrate the red pixel units and the green pixel units.

The method also includes, during time period T3, providing a start voltage signal to the switch control line 307 and the scan line shorting bar 306, to turn on the thin film transistors in all the pixel units in the effective display area. The method also includes, during time period T3, providing a cut-off voltage to the data switch control line 303, so that the two second switch elements 304-2 and 305-2 are both in a cut-off state, and providing a start voltage to the data switch control line 302, so that the first switch elements 304-1 and 305-1 are in a turn-on state. The method also includes, during time period T3, providing the first voltage V1 greater than the common electrode voltage V0 to the data line shorting bar 301, so that light cannot penetrate the red pixel units, so that green pictures are displayed in the display area of the liquid crystal display device. Therefore, the green pictures can be detected.

3) Detecting Blue Pictures

Figure 9:
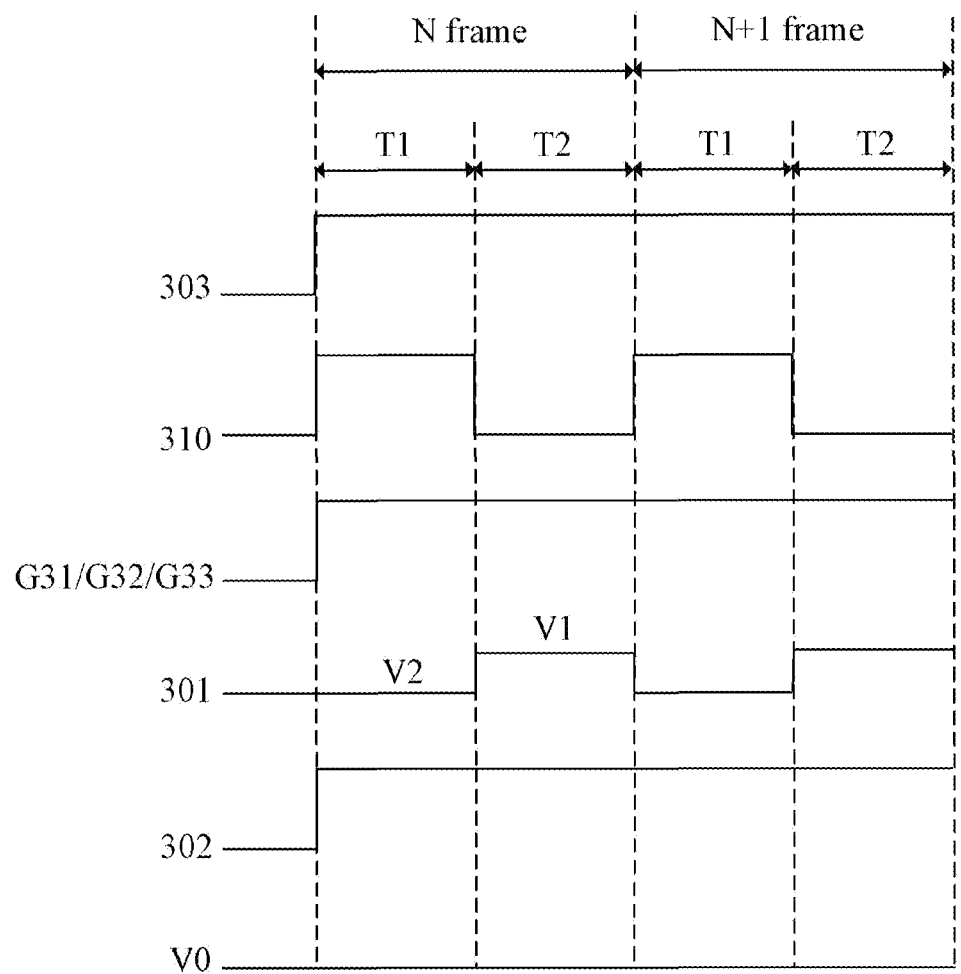
FIG. 9 is a flowchart diagram showing when the liquid crystal display device displays blue pictures in the second embodiment.

Please refer to FIG. 9, which is a timing diagram showing when the liquid crystal display device displays the blue pictures in the second embodiment of the application. As shown in FIG. 9, in a time period of one frame (comprising a time period T1 and a time period T2), the method comprises the following testing steps:

During time period T1, providing a start voltage signal (for example, 15V) to the switch control line 307, the scan line shorting bar 306 and the switch control lines 302, 303 and 310, to turn on all of the two first switch elements 304-1 and 305-1, the two second switch elements 304-2 and 305-2, and the two third switch elements 304-3 and 305-3, and also turn on thin film transistors in all the pixel units in the effective display area. The method also includes, during time period T1, providing the second voltage V2 close to the common electrode voltage V0 to the data line shorting bar 301, so that the liquid crystal display device displays white pictures.

The method also includes, during time period T2, providing a start voltage signal to the switch control line 307 and the scan line shorting bar 306, to make signals on the three scan lines G31, G32 and G33 be the start voltage signal and thus to turn on the thin film transistors in all the pixel units in the effective display area. The method also includes, during time period T2, providing a start voltage to the data switch control lines 302 and 303, so that the two first switch elements 304-1 and 305-1 and the two second switch elements 304-2 and 305-2 are all in a turn-on state, and providing a cut-off voltage to the data switch control line 310, so that the two third switch elements 304-3 and 305-3 are both in a cut-off state. The method also includes, during time period T2, providing the first voltage V1 greater than the common electrode voltage V0 to the data line shorting bar 301, so that light cannot penetrate the red pixel units and the green pixel units, and the blue pictures are displayed in the display area of the liquid crystal display device. Therefore, the blue pictures can be detected.

4) Detecting Black Pictures

Black pictures may be produced using a method including providing a start voltage signal (for example, 15V) to the switch control line 307, the scan line shorting bar 306 and the switch control lines 302, 303 and 310, to turn on all of the two first switch elements 304-1 and 305-1, the two second switch elements 304-2 and 305-2, and the two third switch elements 304-3 and 305-3, and also turn on thin film transistors in all the pixel units in the effective display area. The method also includes providing a first voltage V1 (for example, 5V) greater than a common electrode voltage V0 (for example, 0V) to the data line shorting bar 301, so that the liquid crystal display device displays black pictures. As a result, line defects may be detected.

5) Detecting White Pictures

White pictures may be produced using a method including providing a start voltage signal (for example, 15V) to the switch control line 307 s, the scan line shorting bar 306 and the switch control lines 302, 303 and 310, to turn on all of the two first switch elements 304-1 and 305-1, the two second switch elements 304-2 and 305-2 and the two third switch elements 304-3 and 305-3 and also turn on thin film transistors in all the pixel units in the effective display area. The method also includes providing the second voltage V2 close to the common electrode voltage V0 to the data line shorting bar 301, so that the liquid crystal display device displays white pictures. As a result, line defects may be detected.

In the testing method for the liquid crystal display device provided in the embodiment, the liquid crystal display device can display pictures with various colors such as red, green, blue, black, white and grey by regulating the voltage signals on the plurality of data switch control lines, the switch control line for the scan lines, the data line shorting bar and the scan line shorting bar. All the data lines in the embodiment are connected with the data line shorting bar through the switch elements and are not directly connected with the data line shorting bar, so laser cutting is not used after the test is completed. In addition, through holes are not required by the liquid crystal display device, thereby eliminating the adverse influences of the through hole defect on the liquid crystal display device and ensuring smooth operation of the electric test. Moreover, compared with the prior art, in the embodiment, the area occupied by the data line test area is reduced to thereby facilitate the production of small-sized liquid crystal display devices. In addition, the number of the data lines superposed with the data switch control lines is reduced, and the switch signal delay of the switch elements is reduced.

In the second embodiment, each data line set comprises three data lines for controlling the pixel units of three colors respectively. Further, each data line set can also comprise four data lines for controlling the pixel units of red, green, blue and white respectively. Correspondingly, the liquid crystal display device comprises three data switch control lines. Specifically:

Such embodiments include a fourth data switch control line, where each data line set further comprises a fourth data line, and the fourth data line in each data line set controls pixel units with a same color. The fourth data switch control line intersects the fourth data line in each data line set, and a fourth switch element is formed at each intersection point. A gate electrode of the fourth switch element is arranged on the fourth data switch control line, a source electrode of the fourth switch element is connected with the drain electrode of the third switch element, and a drain electrode of the fourth switch element is connected with the fourth data line at the intersection point.

In this case, the gate electrode of the fourth switch element is arranged on the fourth data switch control line and connected with the fourth data switch control line. The source electrode of the fourth switch element is connected with the drain electrode of the third switch element, so as to be connected with the data line shorting bar through the third switch element, the second switch element, the first switch element and the connecting line.

Third Embodiment

In the second embodiment, the source electrode of the first switch element is connected with the data line shorting bar through the connecting line, the source electrode of the second switch element is connected with the data line shorting bar through the first switch element and the connecting line, and the source electrode of the third switch element is connected with the data line shorting bar through the first switch element, the second switch element and the connecting line. Accordingly, a test signal of the data line shorting bar of the liquid crystal display device in the second embodiment is transmitted to the red signal data lines through one switch element, transmitted to the green signal data lines through two switch elements and transmitted to the blue signal data lines through three switch elements, where the signal is delayed by each of the switch elements. In addition, three time periods T1, T2 and T3 are required when a green picture is displayed. The third embodiment provides a liquid crystal display device which has three data switch control lines, each data line set comprises six data lines, and six switch elements are formed at intersection points of each data line set with the three data switch control lines. The test signal of the data line shorting bar of the liquid crystal display device can be transmitted to the corresponding data lines through only one switch element, so that the signal delay is reduced.

For convenience, four scan lines and a data line set are taken as examples for detailed description below. However, it should be realized that the number of the scan lines and the number of the data lines are not limited thereto.

Figure 10:
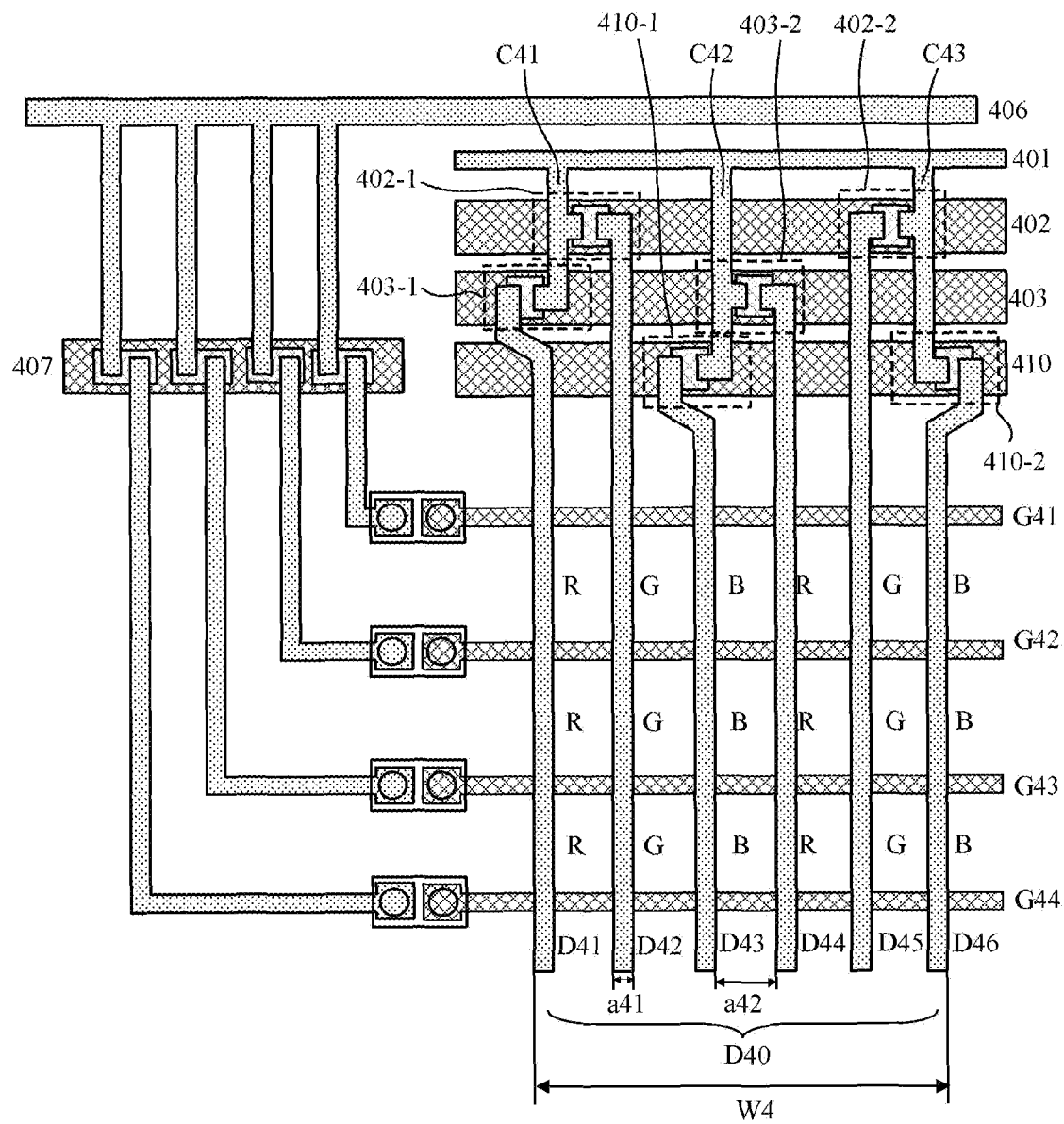
FIG. 10 is a structural schematic diagram of a liquid crystal display device in a third embodiment.

Specifically refer to FIG. 10, which is a schematic diagram of a liquid crystal display device in the third embodiment of the application. The effective display area of the liquid crystal display device comprises four scan lines G41, G42, G43 and G44, a data line set D40, and a plurality of pixel units formed in areas encircled by intersecting the four scan lines G41, G42, G43 and G44 with data lines in the data line set D40.

The data line set D40 comprises six adjacent data lines D41, D42, D43, D44, D45 and D46, wherein the data lines D41 and D44 are red signal data lines and are connected with pixel electrodes R of the red pixel units; the data lines D42 and D45 are green signal data lines and are connected with pixel electrodes G of the green pixel units; and the data lines D43 and D46 are blue signal data lines and are connected with pixel electrodes B of the blue pixel units.

In this case, D41 is a first data line, D42 is a second data line, D43 is a third data line, D44 is a fourth data line, D45 is a fifth data line, and D46 is a sixth data line.

It should be pointed out that in one data line set, the line sequence of respective color signal data lines is not limited thereto, and can be another sequence. For example, the data lines D41 and D44 are green signal data lines, the data lines D42 and D45 are blue signal data lines, the data lines D43 and D46 are red signal data lines and so on.

A first switch element 402-1, a second switch element 402-2, a third switch element 403-1, a fourth switch element 403-2, a fifth switch element 410-1 and a sixth switch element 410-2 are formed at intersection points of the data line set D40 with the three data switch control lines 402, 403 and 410.

In this case, the data switch control line 402 is a first data switch control line, the data switch control line 403 is a second data switch control line, and the data switch control line 410 is a third data switch control line.

Gate electrodes of the first switch element 402-1 and the second switch element 402-2 are arranged on the same data switch control line 402, gate electrodes of the third switch element 403-1 and the fourth switch element 403-2 are arranged on the same data switch control line 403, and gate electrodes of the fifth switch element 410-1 and the sixth switch element 410-2 are arranged on the same data switch control line 410.

Source electrodes of the first switch element 402-1 and the third switch element 403-1 are connected with the data line shorting bar 401 through the first connecting line C41, source electrodes of the second switch element 402-2 and the sixth switch element 410-2 are connected with the data line shorting bar through the third connecting line C43, and source electrodes of the fourth switch element 403-2 and the fifth switch element 410-1 are connected with the data line shorting bar through the second connecting line C42.

Drain electrodes of the first switch element 402-1 and the second switch element 402-2 are arranged on the same data switch control line 402 and connected with the data lines for controlling the green pixel units. In addition, drain electrodes of the third switch element 403-1 and the fourth switch element 403-2 are arranged on the same data switch control line 403 and connected with the data lines for controlling the red pixel units, and drain electrodes of the fifth switch element 410-1 and the sixth switch element 410-2 are arranged on the same data switch control line 410 and connected with the data lines for controlling the blue pixel units.

The scan line test area of the embodiment is as same as that of the first embodiment.

In the embodiment, none of the data line shorting bar, the scan line shorting bar, the data switch control lines and the switch control line for the scan lines are connected with test terminals, so test signals can be applied to the data line shorting bar, the scan line shorting bar, the data switch control lines and the switch control line for the scan lines. However, it should be realized that the data line shorting bar, the scan line shorting bar, the data switch control lines and the switch control line for the scan lines can also be connected with the test terminals, and the test terminals can be made of the same materials as or different materials from the data line shorting bar, the scan line shorting bar, the data switch control lines and the switch control line for the scan lines. In addition, a plurality of test terminals can be made of the same or different materials, for example, one part of the test terminals can be made of molybdenum, while the other part of the test terminals can be made of aluminum or aluminum alloy.

It can be seen from the above that the test signals of the data line shorting bar of the liquid crystal display device can be transmitted to the corresponding data lines only through one switch element, so that the signal delay is reduced.

Moreover, as shown in FIG. 10, in the embodiment, if line widths of the data lines D41, D42, D43, D44, D45 and D46 are a41 and distances between adjacent data lines are a42, then the distance W4 between the data line D41 and the data line D46 is 6*a41+5*a42; and if a41=a42=a, then W4=11a. Compared with the prior art, in the embodiment, the width of the data line test area, which can be reduced, is W1−W4=12a, thereby reducing the area occupied by the data line test area and facilitating the production of small-sized liquid crystal display devices.

The liquid crystal display device in a normally white mode is taken as an example below to describe the testing method for the liquid crystal display device according to the embodiment in details.

1) Detecting Red Pictures

Figure 11:
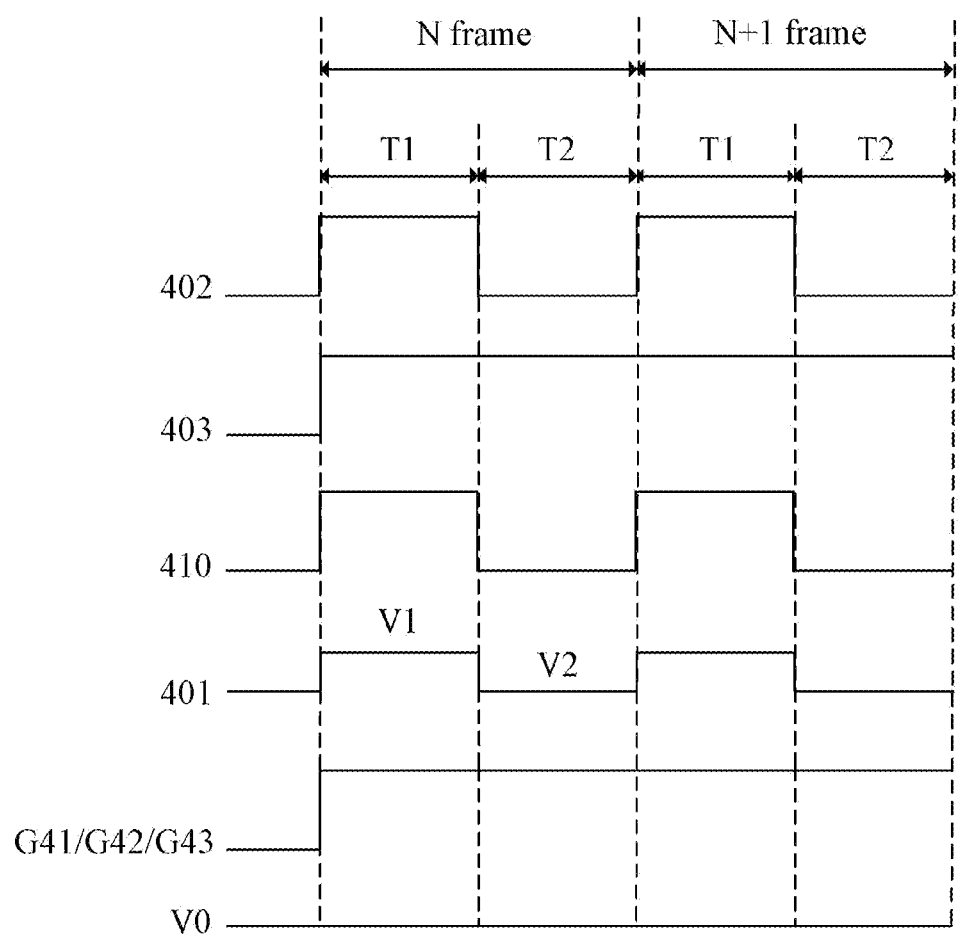
FIG. 11 is a flowchart diagram showing when the liquid crystal display device displays red pictures in the third embodiment.

Please refer to FIG. 11, which is a timing diagram showing when the liquid crystal display device displays the red pictures in the third embodiment of the application. As shown in FIG. 11, in a time period of one frame (comprising a time period T1 and a time period T2), the method comprises the following testing steps:

During time period T1, providing a start voltage signal (for example, 15V) to the switch control line 407, the scan line shorting bar 406 and the switch control lines 402, 403 and 410, to turn on all of the first switch element 402-1, the second switch element 402-2, the third switch element 403-1, the fourth switch element 403-2, the fifth switch element 410-1, and the sixth switch element 410-2, and also turn on thin film transistors in all the pixel units in the effective display area. The method also includes, during time period T1, providing a first voltage V1 (for example, 5V) greater than a common electrode voltage V0 (for example, 0V) to the data line shorting bar 401, so that the liquid crystal display device displays black pictures.

The method also includes, during time period T2, providing a start voltage signal to the switch control line 407 and the scan line shorting bar 406, to make signals on the four scan lines G41, G42, G43 and G44 be the start voltage signals and thus turn on the thin film transistors in all the pixel units of the effective display area. The method also includes, during time period T2, providing a start voltage signal to the switch control line 403, so that the third switch element 403-1 and the fourth switch element 403-2 are in a turn-on state, and providing a cut-off voltage signal to the switch control lines 402 and 410, so that the first switch element 402-1, the second switch element 402-2, the fifth switch element 410-1 and the sixth switch element 410-2 are all in a cut-off state. The method also includes, during time period T2, providing a second voltage V2 (for example, 0.01V) close to the common electrode voltage V0 to the data line shorting bar 401, and applying signals of the second voltage V2 to the red pixel electrodes through the red signal data lines D41 and D44, so that light can penetrate the red pixel units, and finally the red pictures are displayed in the display area of the liquid crystal display device. Therefore, the red pictures can be detected.

2) Detecting Green Pictures

Figure 12:
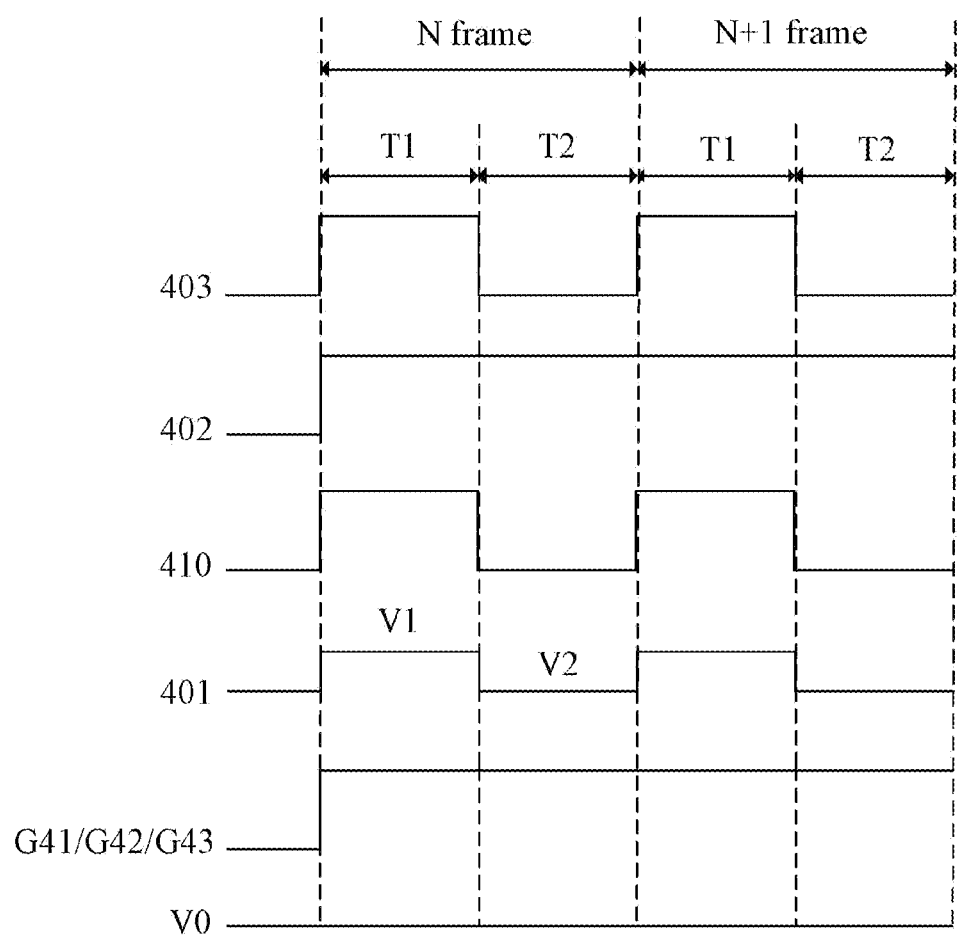
FIG. 12 is a flowchart diagram showing when the liquid crystal display device displays green pictures in the third embodiment.

Please refer to FIG. 12, which is a timing diagram showing when the liquid crystal display device displays the green pictures in the third embodiment of the application. As shown in FIG. 12, in a time period of one frame (comprising a time period T1 and a time period T2), the method comprises the following testing steps:

During time period T1, providing a start voltage signal (for example, 15V) to the switch control line 407, the scan line shorting bar 406 and the switch control lines 402, 403 and 410, to turn on all of the first switch element 402-1, the second switch element 402-2, the third switch element 403-1, the fourth switch element 403-2, the fifth switch element 410-1, and the sixth switch element 410-2, and also to turn on thin film transistors in all the pixel units in the effective display area. The method also includes, during time period T1, providing a first voltage V1 (for example, 5V) greater than a common electrode voltage V0 (for example, 0V) to the data line shorting bar 401, so that the liquid crystal display device displays black pictures.

The method also includes, during time period T2, providing a start voltage signal to the switch control line 407 and the scan line shorting bar 406, to make signals on the four scan lines G41, G42, G43 and G44 be the start voltage signals and thus turn on the thin film transistors in all the pixel units in the effective display area. The method also includes, during time period T2, providing a cut-off voltage signal to the switch control lines 403 and 410, so that the third switch element 403-1, the fourth switch element 403-2, the fifth switch element 410-1 and the sixth switch element 410-2 are all in a cut-off state, and providing a start voltage signal to the data switch control line 402, so that the first switch element 402-1 and the second switch element 402-2 are in a turn-on state. The method also includes, drink. T2, providing a second voltage V2 (for example, 0.01V) close to the common electrode voltage V0 to the data line shorting bar 401, and applying signals of the second voltage V2 to the green pixel electrodes through the green signal data lines D42 and D45, so that light can penetrate the green pixel units. As a result, green pictures are displayed in the display area of the liquid crystal display device. Therefore, the green pictures can be detected.

3) Detecting Blue Pictures

Figure 13:
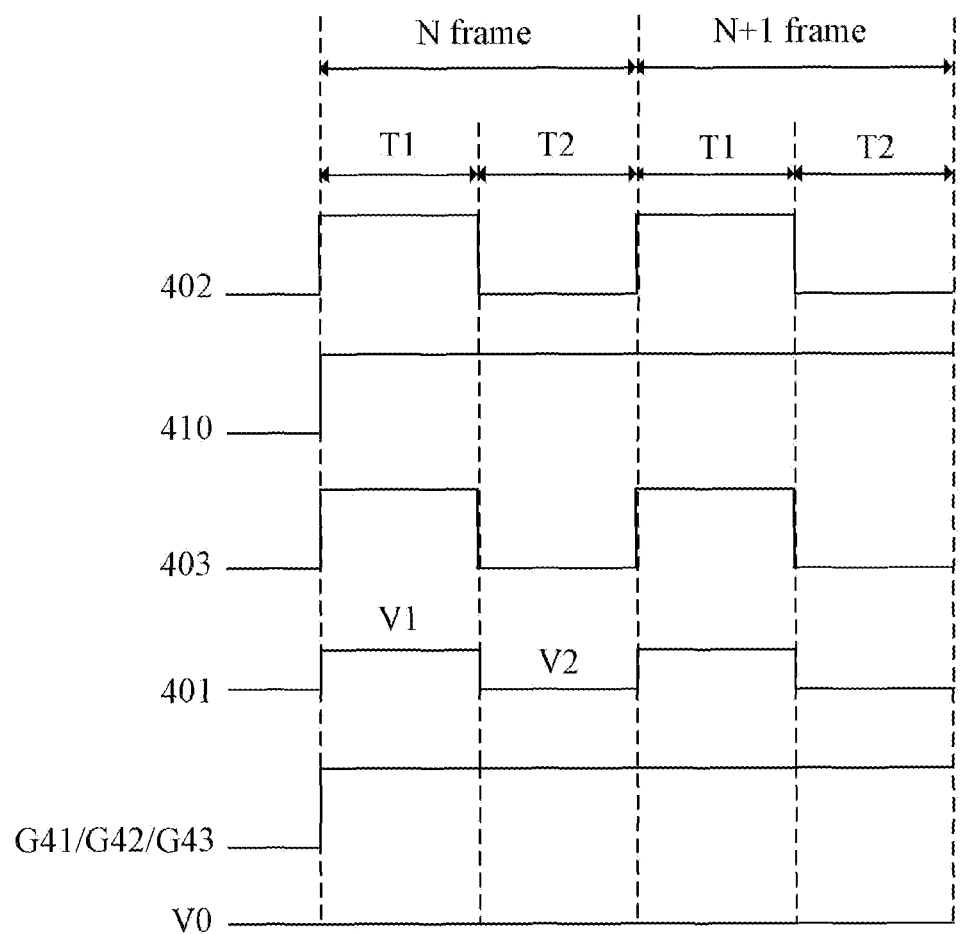
FIG. 13 is a flowchart diagram showing when the liquid crystal display device displays blue pictures in the third embodiment.

Please refer to FIG. 13, which is a timing diagram showing when the liquid crystal display device displays the blue pictures in the third embodiment of the application. As shown in FIG. 13, in a time period of one frame (comprising a time period T1 and a time period T2), the method comprises the following testing steps:

During time period T1, providing a start voltage signal (for example, 15V) to the switch control line 407, the scan line shorting bar 406 and the switch control lines 402, 403 and 410, to turn on all of the first switch element 402-1, the second switch element 402-2, the third switch element 403-1, the fourth switch element 403-2, the fifth switch element 410-1 and the sixth switch element 410-2 and also turn on thin film transistors in all the pixel units in the effective display area. The method also includes, during time period T1, providing a first voltage V1 (for example, 5V) greater than a common electrode voltage V0 (for example, 0V) to the data line shorting bar 401, so that the liquid crystal display device displays black pictures.

The method also includes, during time period T2, providing a start voltage signal to the switch control line 407 and the scan line shorting bar 406, to make signals on the four scan lines G41, G42, G43 and G44 be the start voltage signals and thus turn on the thin film transistors in all the pixel units in the effective display area. The method also includes, during time period T2, providing a cut-off voltage signal to the switch control lines 402 and 403, so that the first switch element 402-1, the second switch element 402-2, the third switch element 403-1 and the fourth switch element 403-2 are all in a cut-off state, and providing a start voltage signal to the data line switch control line 410, so that the fifth switch element 410-1 and the sixth switch element 410-2 are in a turn-on state. The method also includes, during time period T2, providing the second voltage V2 (for example, 0.01V) close to the common electrode voltage V0 to the data line shorting bar 401, and applying signals of the second voltage V2 to the blue pixel electrodes through the green signal data lines D43 and D46, so that light can penetrate the blue pixel units. As a result, blue pictures are displayed in the display area of the liquid crystal display device. Therefore, the blue pictures can be detected.

4) Detecting Black Pictures

Black pictures may be produced using a method including providing a start voltage signal (for example, 15V) to the switch control line 407, the scan line shorting bar 406 and the switch control lines 402, 403 and 410, to turn on all of the first switch element 402-1, the second switch element 402-2, the third switch element 403-1, the fourth switch element 403-2, the fifth switch element 410-1, and the sixth switch element 410-2, and also to turn on thin film transistors in all the pixel units in the effective display area. The method also includes providing a first voltage V1 (for example, 5V) greater than a common electrode voltage V0 (for example, 0V) to the data line shorting bar 401, so that the liquid crystal display device displays black pictures. As a result, line defects may be detected.

5) Detecting White Pictures

White pictures may be produced using a method including providing a start voltage signal (for example, 15V) to the switch control line 407, the scan line shorting bar 406 and the switch control lines 402, 403 and 410, to turn on all of the first switch element 402-1, the second switch element 402-2, the third switch element 403-1, the fourth switch element 403-2, the fifth switch element 410-1, and the sixth switch element 410-2, and also to turn on thin film transistors in all the pixel units in the effective display area. The method also includes providing the second voltage V2 (for example, 0.01V) close to the common electrode voltage V0 (for example, 0V) to the data line shorting bar 401, so that the liquid crystal display device displays the white pictures. As a result, line defects may be detected.

In the third embodiment, a data line set comprises six data lines for controlling the pixel units of three colors respectively. Further, a data line set can also comprise eight data lines for controlling the pixel units of red, green, blue and white respectively. Correspondingly, the liquid crystal display device comprises four data switch control lines.

In conclusion, in the testing method for the liquid crystal display device provided in the embodiment, the liquid crystal display device can display pictures with various colors such as red, green, blue, black, white and grey by regulating the voltage signals on the plurality of data switch control lines, the switch control line for the scan lines, the data line shorting bar and the scan line shorting bar. The test signals of the data line shorting bar of the liquid crystal display device can be transmitted to the corresponding data lines through only one switch element, and compared with the second embodiment, the signal delay is reduced. In addition, through holes are not required by the liquid crystal display device, thereby eliminating the adverse influences of the through hole defect on the liquid crystal display device and ensuring smooth operation of the electric test. Moreover, compared with the prior art, in the embodiment, the area occupied by the data line test area is reduced to thereby facilitate the production of small-sized liquid crystal display devices.

It should be pointed out that the respective embodiments have been described progressively in the specification, where the description of each of the embodiments has emphasized its difference(s) from the other embodiments, and mutual reference can be made to the description of the related part(s). Moreover, very simple forms and non-precise ratios are adopted in the drawings only for the purpose of conveniently and clearly illustrating the respective embodiments of the application in an auxiliary mode.

Those skilled in the art shall appreciate that the embodiments of the invention can be embodied as a method, a system or a computer program product. Therefore, embodiments may be all-hardware, all-software or software and hardware in combination. Furthermore, embodiments may include a computer program product as one or more computer useable storage mediums (including but not limited to a disk memory, a CD-ROM, an optical memory, etc.) in which computer useable program instructions are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

The foregoing description of the disclosed embodiments enables those skilled in the art to practice or use the invention. Numerous modifications to these embodiments will be apparent to those skilled in the art, and the general principle defined herein can be embodied in other embodiments without departing from the spirit or scope of the invention. Accordingly the invention will not be limited to these embodiments illustrated herein but shall conform to the broadest scope consistent with the principle and novel characteristics disclosed herein.

What is claimed is:

1. A liquid crystal display device, comprising:
    a plurality of scan lines;
    a plurality of data line sets intersecting the scan lines, wherein each data line set comprises a first data line, a second data line, a third data line;
    a plurality of pixel units formed near intersections of the scan lines and the data lines,
    wherein the first data line in each data line set controls pixel units having a first color, the second data line in each data line set controls pixel units having a second color, and the third data line in each data line set controls pixel units having a third color;
    a data line shorting bar;
    a first data switch control line;
    a second data switch control line,
    wherein the first data line in each data line set is connected with the data line shorting bar,
    wherein the first data switch control line intersects the second data line in each data line set;
    a first switch element formed at each intersection of the second data lines and the first data switch control line, wherein a gate electrode of the first switch element is arranged on the first data switch control line, a source electrode of the first switch element is connected with the data line shorting bar, and a drain electrode of the first switch element is connected with the second data line, and
    wherein the second data switch control line intersects the third data line in each data line set; and a second switch element formed at each intersection of the third data lines and the second data switch control line, wherein a gate electrode of the second switch element is arranged on the second data switch control line, a source electrode of the second switch element is connected with the data line shorting bar through the first switch element, and a drain electrode of the second switch element is connected with the third data line.

2. The liquid crystal display device of claim 1, further comprising:
a scan line shorting bar;
a switch control line for the scan lines; and
a plurality of switch elements for the scan lines,
wherein gate electrodes of the switch elements for the scan lines are arranged on the switch control line for the scan lines, wherein source electrodes of the switch elements are connected with the scan line shorting bar, and wherein drain electrodes of the switch elements are connected with the plurality of scan lines.

3. The liquid crystal display device of claim 2, wherein the drain electrodes of the switch elements are connected with the scan lines via through holes.

4. The liquid crystal display device of claim 1, wherein the source electrode of the second switch elements are connected with the drain electrodes of the first switch elements, and are connected with the data line shorting bar through the first switch elements.

5. The liquid crystal display device of claim 1, further comprising a third data switch control line, wherein each data line set further comprises a fourth data line, and the fourth data line in each data line set controls pixel units with a fourth color,
wherein the third data switch control line intersects the fourth data line in each data line set, and a third switch element is formed at each intersection of the fourth data line and the third data switch control line, and
wherein a gate electrode of the third switch element is arranged on the third data switch control line, a source electrode of the third switch element is connected with the drain electrode of the second switch element, and a drain electrode of the third switching element is connected with the fourth data line.

6. The liquid crystal display device of claim 1, further comprising at least one of the following test terminals:
a test terminal connected with the data line shorting bar; and
test terminals connected with the switch control lines for the data lines.

7. The liquid crystal display device of claim 2, further comprising at least one of the following test terminals:
a test terminal connected with the scan line shorting bar; and
a test terminal connected with the switch control line for the scan lines.

8. The liquid crystal display device of claim 1, wherein the first data line in each data line set is directly connected with the data line shorting bar.

* * * * *